US012647987B2

(12) United States Patent
Yi et al.

(10) Patent No.: US 12,647,987 B2
(45) Date of Patent: Jun. 2, 2026

(54) METHOD AND DEVICE FOR UPLINK CHANNEL TRANSMISSION IN WIRELESS COMMUNICATION SYSTEM

(71) Applicant: Samsung Electronics Co., Ltd., Suwon-si (KR)

(72) Inventors: Junyung Yi, Suwon-si (KR); Jeongho Yeo, Suwon-si (KR); Suha Yoon, Suwon-si (KR); Youngbum Kim, Suwon-si (KR); Sungjin Park, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/571,498

(22) PCT Filed: Jun. 22, 2022

(86) PCT No.: PCT/KR2022/008881
§ 371 (c)(1),
(2) Date: Dec. 18, 2023

(87) PCT Pub. No.: WO2022/270907
PCT Pub. Date: Dec. 29, 2022

(65) Prior Publication Data
US 2024/0323964 A1      Sep. 26, 2024

(30) Foreign Application Priority Data
Jun. 23, 2021      (KR) ........................ 10-2021-0081390

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0055* (2013.01); *H04L 25/0224* (2013.01); *H04W 72/0446* (2013.01)

(58) Field of Classification Search
CPC ........................ H04W 72/21; H04W 72/0446; H04L 5/0055; H04L 25/0224
(Continued)

(56) References Cited

U.S. PATENT DOCUMENTS

2020/0052827 A1     2/2020  Vilaipornsawai et al.
2020/0314948 A1 *  10/2020  Babaei .................. H04W 52/00
(Continued)

FOREIGN PATENT DOCUMENTS

KR     10-2022-0129270 A     9/2022
KR     10-2022-0135577 A    10/2022

OTHER PUBLICATIONS

Iith et al., On TB processing over multiple slots for PUSCH, R1-2102913, 3GPP TSG RAN WG1 Meeting #104b-e, Apr. 6, 2021.
(Continued)

*Primary Examiner* — Christopher M Crutchfield
*Assistant Examiner* — Jean F Voltaire
(74) *Attorney, Agent, or Firm* — Jefferson IP Law, LLP

(57) ABSTRACT

The present disclosure relates to a 5G or 6G communication system for supporting a higher data transmission rate. The present disclosure provides a method for improving the coverage of an uplink channel for uplink transmission. A method performed by means of a terminal in a wireless communication system, according to one embodiment of the present disclosure, may comprise the steps of: receiving, from a base station, PUSCH configuration information for joint channel estimation by using transport block (TB) processing over multi-slots (TBoMS) in which one TB is
(Continued)

allocated and transmitted to multiple slots, and a DMRS received through a plurality of PUSCHs; transmitting, to the base station, at least one PUSCH according to the PUSCH configuration information; receiving, from the base station, feedback delay information and a PDCCH, which includes an HARQ process number corresponding to the at least one PUSCH; and determining, on the basis of the PUSCH configuration information and the feedback delay information, the validity of HARQ-ACK information included in the PDCCH.

15 Claims, 18 Drawing Sheets

(51) Int. Cl.
  *H04L 25/02* (2006.01)
  *H04W 72/0446* (2023.01)
(58) Field of Classification Search
  USPC ........................................................ 370/329
  See application file for complete search history.

(56) References Cited

U.S. PATENT DOCUMENTS

| | | | |
|---|---|---|---|
| 2020/0367208 A1 | 11/2020 | Khoshnevisan et al. | |
| 2021/0144743 A1* | 5/2021 | Rastegardoost | ...... H04W 72/23 |
| 2021/0400714 A1* | 12/2021 | Huang | .................. H04L 1/1896 |
| 2022/0303988 A1 | 9/2022 | Yi et al. | |
| 2022/0329353 A1 | 10/2022 | Yi et al. | |

OTHER PUBLICATIONS

Vivo, Discussion on PUSCH TB processing over multiple slots, R1-2102535, 3GPP TSG RAN WG1 #104b-e, e-Meeting, Apr. 6, 2021.
Moderator (Vivo), Feature lead summary#1 on NR-U CG, R1-2101828, 3GPP TSG RAN WG1 Meeting #104-e, e-Meeting, Jan. 26, 2021.
3GPP TS 38.213 V18.0.0, 3rd Generation Partnership Project; Technical Specification Group Radio Access Network; NR; Physical layer procedures for control, (Release 18), Sep. 28, 2023.
International Search Report dated Oct. 7, 2022, issued in International Application No. PCT/KR2022/008881.

* cited by examiner

A first symbol of the PDCCH reception over multiple PUSCH:

- Validation of HARQ-ACK information for a PUSCH transmission configured by ConfiguredGrantConfig (801):

- Validation of HARQ-ACK information for a PUSCH transmission configured by a DCI format (804):

Transport block processing over multi-slot PUSCH(TBoMS):

Multiple slots

PUSCH repetition type A like TDRA for TBoMS (S=5, L=9, k=4) (906):

FIG. 10

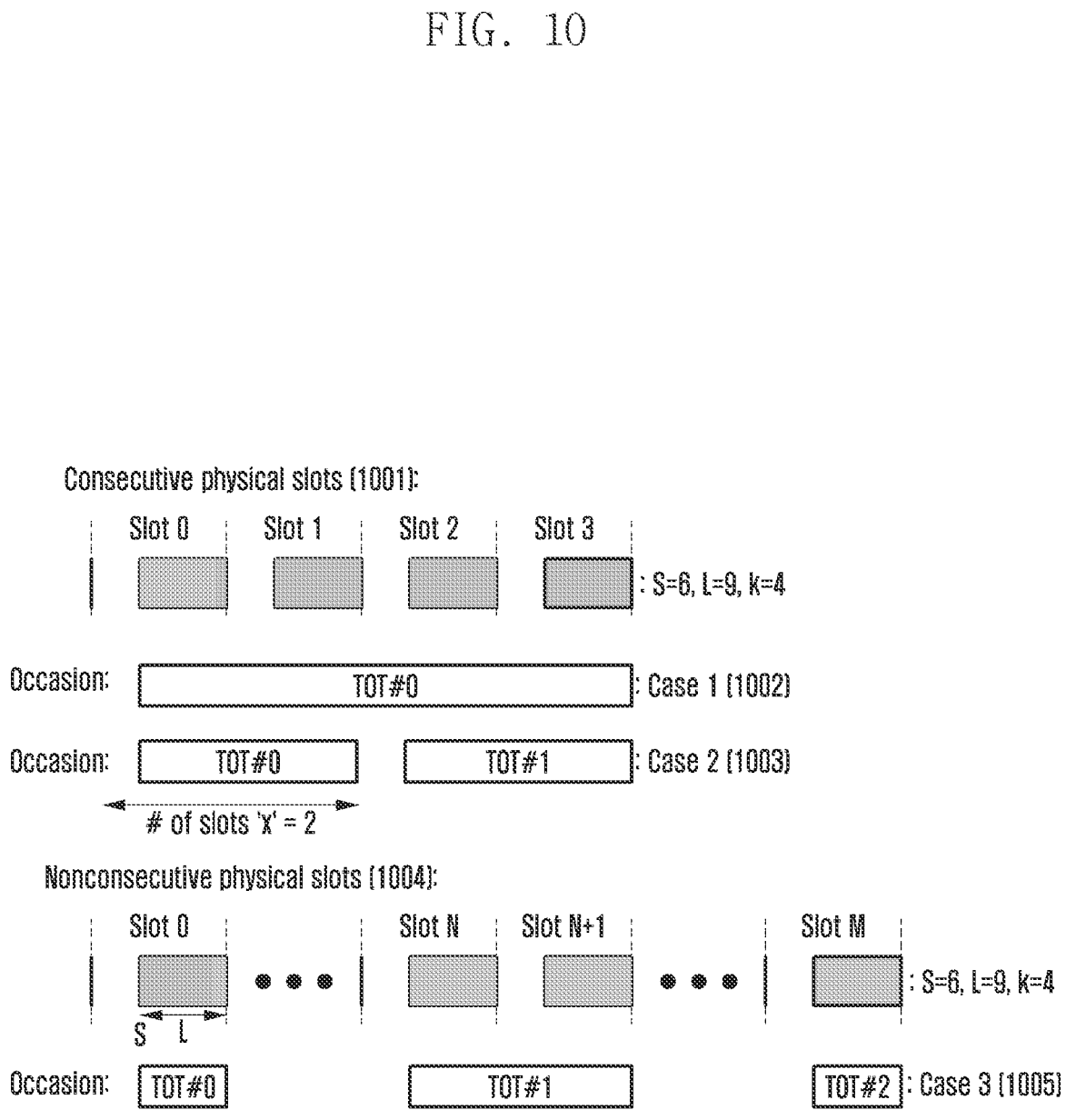

Consecutive physical slots (1001):

| Slot 0 | Slot 1 | Slot 2 | Slot 3 |

: S=6, L=9, k=4

Occasion: | TOT#0 | : Case 1 (1002)

Occasion: | TOT#0 |  | TOT#1 | : Case 2 (1003)

# of slots 'X' = 2

Nonconsecutive physical slots (1004):

| Slot 0 | ● ● ● | Slot N | Slot N+1 | ● ● ● | Slot M |

S  L

: S=6, L=9, k=4

Occasion: | TOT#0 |  | TOT#1 |  | TOT#2 | : Case 3 (1005)

A first symbol of the PDCCH reception based on joint channel estimation with same TB:

- TDRA like PUSCH repetition type A(1101)

- TDRA like PUSCH repetition type B(1104)

A first symbol of the PDCCH reception based on joint channel estimation with different TBs:

- TDRA like PUSCH repetition type A(1201)

- TDRA like PUSCH repetition type B (1204)

A first symbol of the PDCCH reception based on joint channel estimation:

- TDRA like PUSCH repetition type A(1301)

- TDRA like PUSCH repetition type B(1304)

FIG. 14

METHOD AND DEVICE FOR UPLINK CHANNEL TRANSMISSION IN WIRELESS COMMUNICATION SYSTEM

TECHNICAL FIELD

The disclosure relates to a method and device for transmitting and receiving an uplink channel by a base station or terminal in a wireless communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a Beyond 4G Network communication system or a Post LTE System. The 5G communication system defined by the 3rd generation partnership project (3GPP) is called a new radio (NR) system. To achieve a high data transmission rate, the implementation of 5G communication systems in an ultra-high-frequency (mmWave) band (for example, a 60 GHz band) is being considered. To reduce path loss of radio waves and increase a transfer distance of radio waves in an ultra-high-frequency band, in 5G communication systems, various technologies for beamforming, massive multiple input multiple output (massive MIMO), full dimensional MIMO (FD-MIMO), array antenna, analog beam-forming, and large-scale antenna are being discussed, and applied to the NR system. Also, to improve the network of the system, technologies, such as evolved small cell, advanced small cell, cloud radio access network (cloud RAN), ultra-dense networks, device to device communication (D2D), wireless backhaul, moving networks, cooperative communication, coordinated multi-points (COMP), and interference cancellation, have been developed for 5G communication systems. In addition, in the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

Meanwhile, the Internet is evolving from a human-centered network in which humans generate and consume information to an Internet of Things (IoT) network in which distributed components such as objects transmit, receive, and process information. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars or connected cars, smart grids, health care, smart appliances, and advanced medical services, through convergence and combination between existing information technology (IT) and various industries.

Accordingly, various attempts to apply a 5G communication system to an IoT network are being made. For example, technology, such as sensor networks, M2M communication, and MTC, is implemented by 5G communication technologies, such as beam forming, MIMO, and array antenna. Applying a cloud radio access network (CRAN) as the above described big data processing technology is also an example of the convergence of 5G technology and IoT technology.

With the recent development of 5G communication systems, there is an increasing need for a method for repeatedly transmitting an uplink in order to extend a cell coverage in the ultra-high-frequency (mmWave) band.

DISCLOSURE OF INVENTION

Technical Problem

The disclosure proposes a method and device for transmitting a physical uplink shared channel (PUSCH) through multiple slots to improve coverage of an uplink channel in a wireless communication system.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In order to solve the above problems, an embodiment of the disclosure may provide a method performed by a terminal in a wireless communication system, comprising receiving, from a base station, PUSCH configuration information for joint channel estimation by using transport block (TB) processing over multi-slots (TBoMS) in which one TB is allocated and transmitted to multiple slots, or a DMRS received through a plurality of PUSCHs; transmitting, to the base station, at least one PUSCH according to the PUSCH configuration information; receiving, from the base station, feedback delay information and a PDCCH, which includes an HARQ process number corresponding to the at least one PUSCH; and determining, on a basis of the PUSCH configuration information and the feedback delay information, validity of HARQ-ACK information included in the PDCCH.

In order to solve the above problems, an embodiment of the disclosure may provide a method performed by a base station in a wireless communication system, comprising transmitting, to a terminal, PUSCH configuration information for joint channel estimation by using transport block (TB) processing over multi-slots (TBoMS) in which one TB is allocated and transmitted to multiple slots, or a DMRS received through a plurality of PUSCHs; receiving, from the terminal, at least one PUSCH according to the PUSCH configuration information; transmitting, to the terminal, feedback delay information and a PDCCH, which includes an HARQ process number corresponding to the at least one PUSCH; and determining, on a basis of the PUSCH configuration information and the feedback delay information, validity of HARQ-ACK information included in the PDCCH.

In order to solve the above problems, an embodiment of the disclosure may provide a terminal in a wireless communication system, comprising a transceiver that transmits and receives a signal; and a controller, wherein the controller is configured to receive, from a base station, PUSCH configuration information for joint channel estimation by using transport block (TB) processing over multi-slots (TBoMS) in which one TB is allocated and transmitted to multiple slots, or a DMRS received through a plurality of PUSCHs; transmit, to the base station, at least one PUSCH according to the PUSCH configuration information; receive, from the base station, feedback delay information and a PDCCH, which includes an HARQ process number corresponding to the at least one PUSCH; and determine, on a basis of the PUSCH configuration information and the feedback delay information, validity of HARQ-ACK information included in the PDCCH.

In order to solve the above problems, an embodiment of the disclosure may provide a base station in a wireless communication system, comprising a transceiver that transmits and receives a signal; and a controller, wherein the controller is configured to transmit, to a terminal, PUSCH configuration information for joint channel estimation by using transport block (TB) processing over multi-slots (TBoMS) in which one TB is allocated and transmitted to multiple slots, or a DMRS received through a plurality of PUSCHs; receive, from the terminal, at least one PUSCH according to the PUSCH configuration information; transmit, to the terminal, feedback delay information and a PDCCH, which includes an HARQ process number corresponding to the at least one PUSCH; and determine, on a basis of the PUSCH configuration information and the feedback delay information, validity of HARQ-ACK information included in the PDCCH.

Advantageous Effects of Invention

According to an embodiment of the disclosure, methods for determining and configuring the validity of hybrid automatic repeat request acknowledgment (HARQ ACK) information when performing joint channel estimation for multiple-PUSCH transmission and uplink transmission with one transport block (TB) mapped to multiple slots are provided. Through the method of the disclosure, resources can be efficiently utilized and coverage of the uplink channel can be improved by improving the performance of joint channel estimation.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 2 is a diagram illustrating a slot structure considered in a 5G system.

FIG. 4 is a diagram illustrating an example of channel estimation using DMRS received through one PUSCH in a time band in a 5G system.

4

Figure 7:
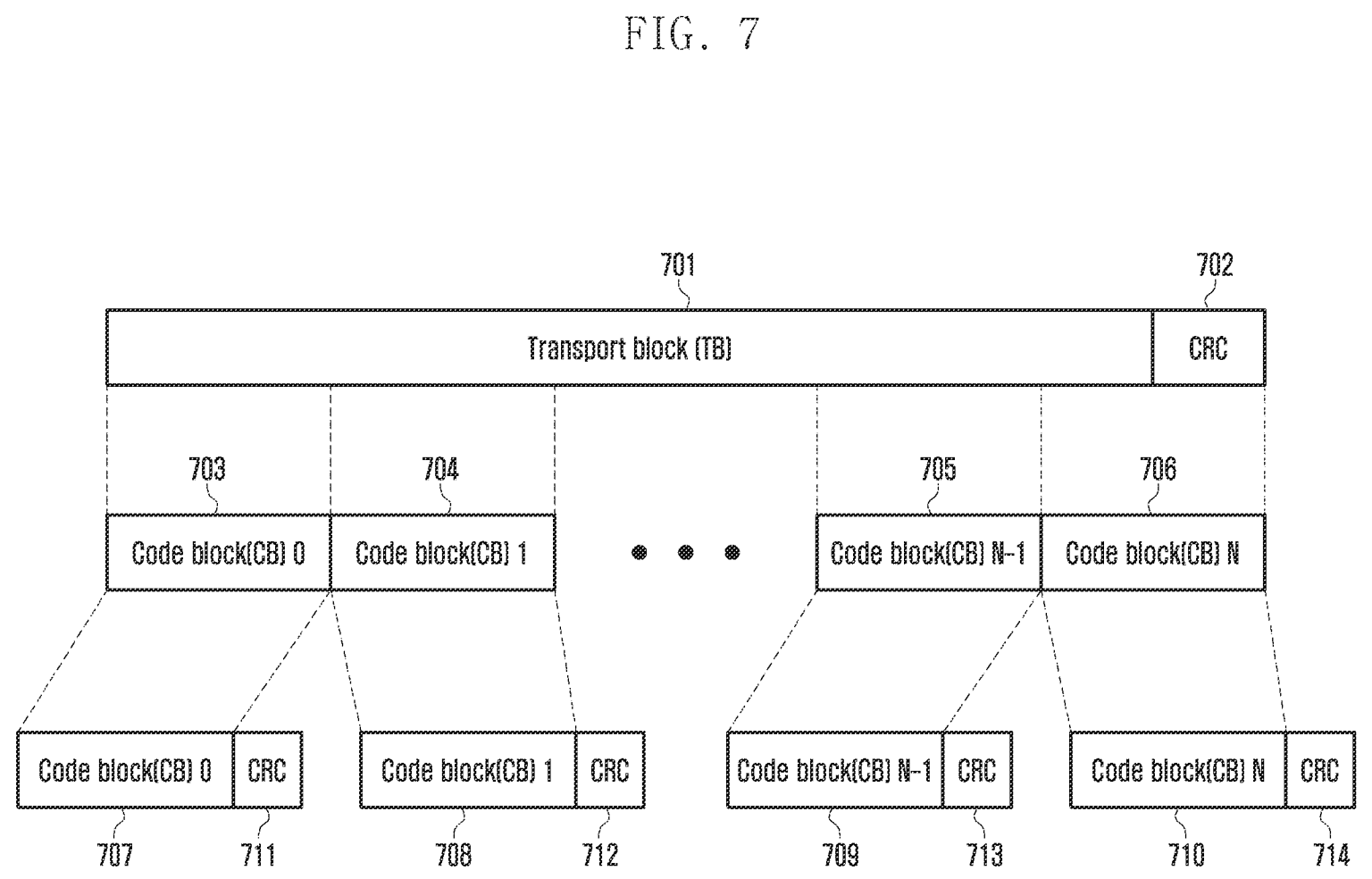

FIG. 7 is a diagram illustrating an example of a process of segmenting a transport block (TB) into a plurality of code blocks (CBs) and adding CRC in a 5G communication system.

Figure 8:
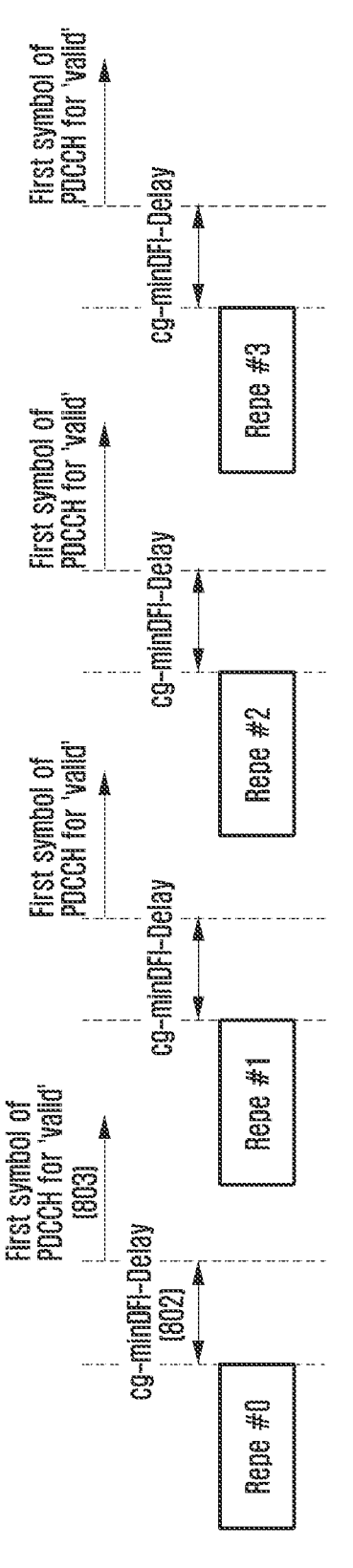
Figure 8:
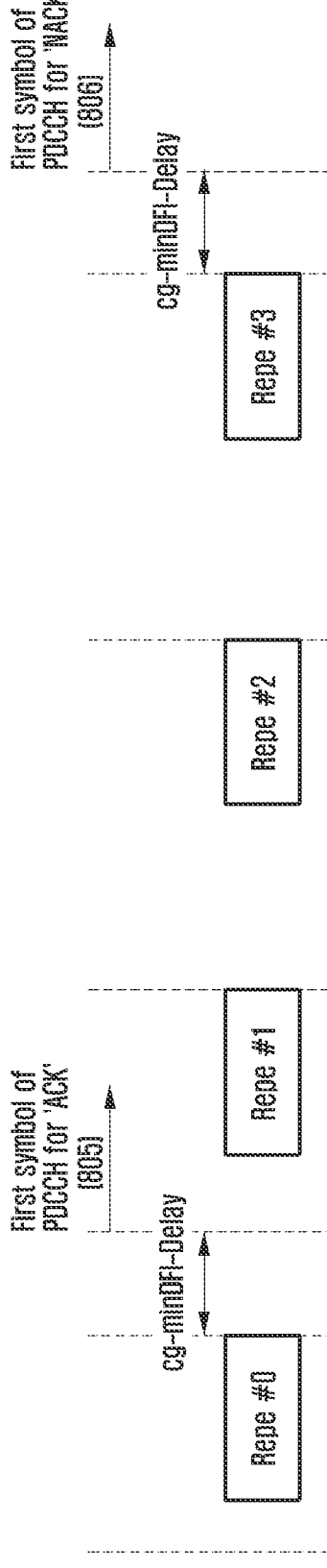

FIG. 8 is a diagram illustrating a method for determining the validity of HARQ-ACK information for PUSCH transmission in a 5G system.

Figure 9:
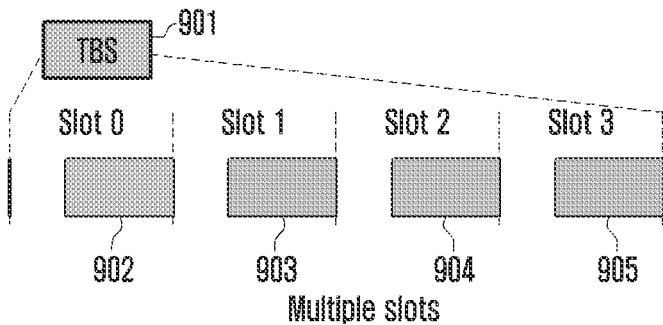
Figure 9:
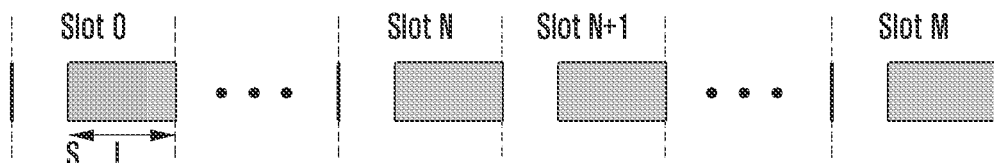

FIG. 9 is a diagram illustrating TB processing over multi-slot (TBoMS) PUSCH transmission in a 5G system.

FIG. 10 is a diagram illustrating transmission occasion for TBoMS (TOT) of TB processing over multi-slot (TBoMS) PUSCH transmission in a 5G system.

Figure 11:
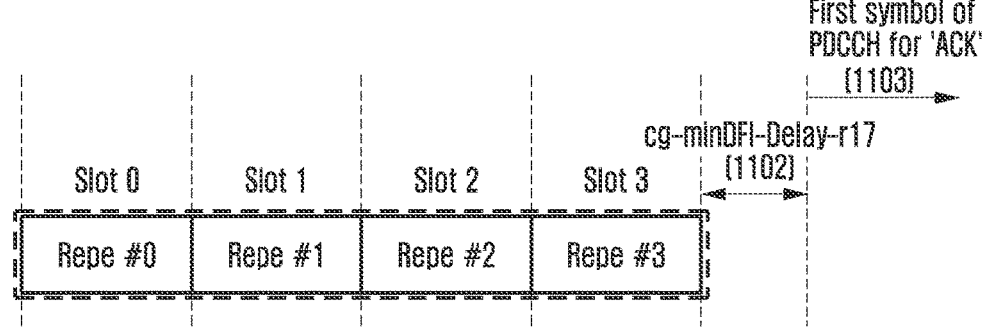
Figure 11:
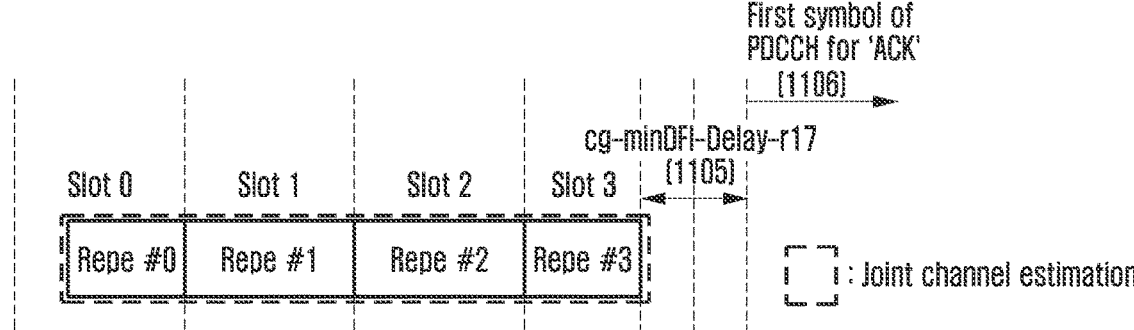

FIG. 11 is a diagram for explaining the operation of a terminal that determines validity of HARQ-ACK information for PUSCH repetitive transmission that performs joint channel estimation in a 5G system.

Figure 12:
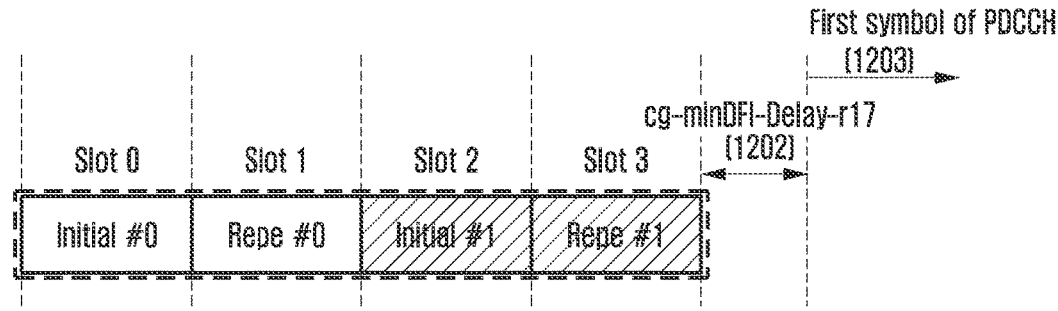
Figure 12:
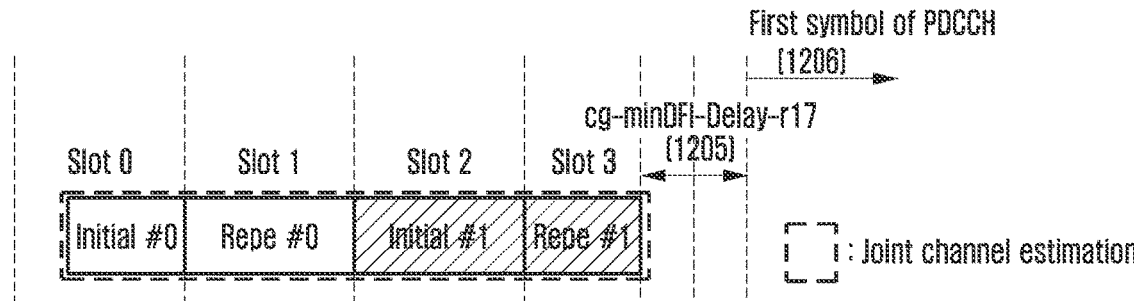

FIG. 12 is a diagram for explaining the operation of a terminal that determines validity of HARQ-ACK information for PUSCH repetitive transmission consisting of several different TBs that performs joint channel estimation in a 5G system.

Figure 13:
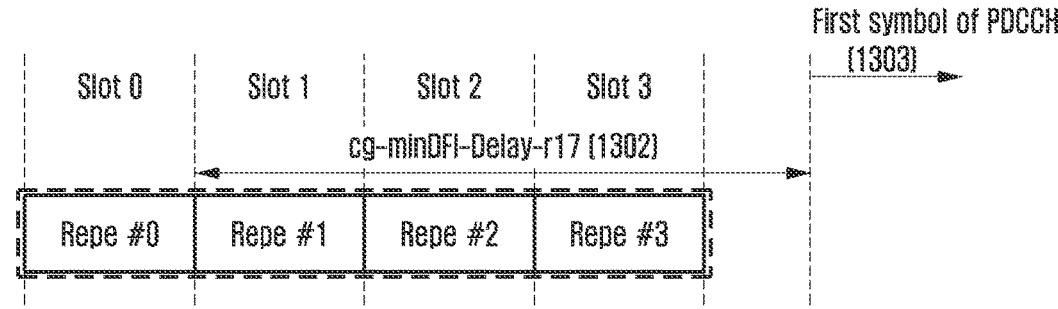
Figure 13:
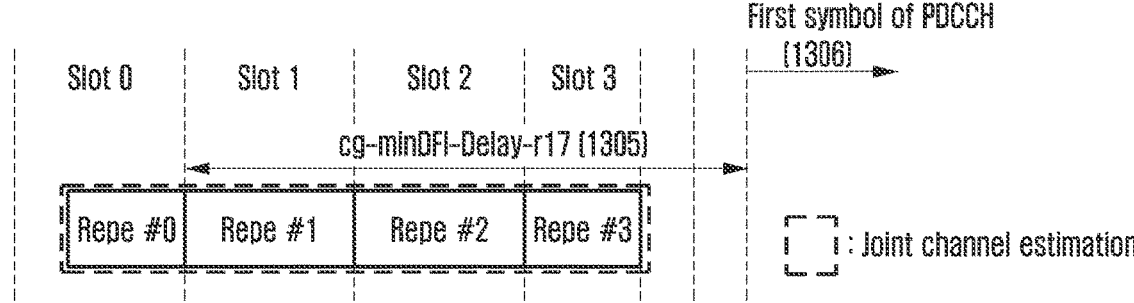

FIG. 13 is a diagram for explaining the operation of a terminal that configures cg-minDFI-Delay to determine validity of HARQ-ACK information for PUSCH repetitive transmission consisting of several different TBs that performs joint channel estimation in a 5G system.

Figure 14:
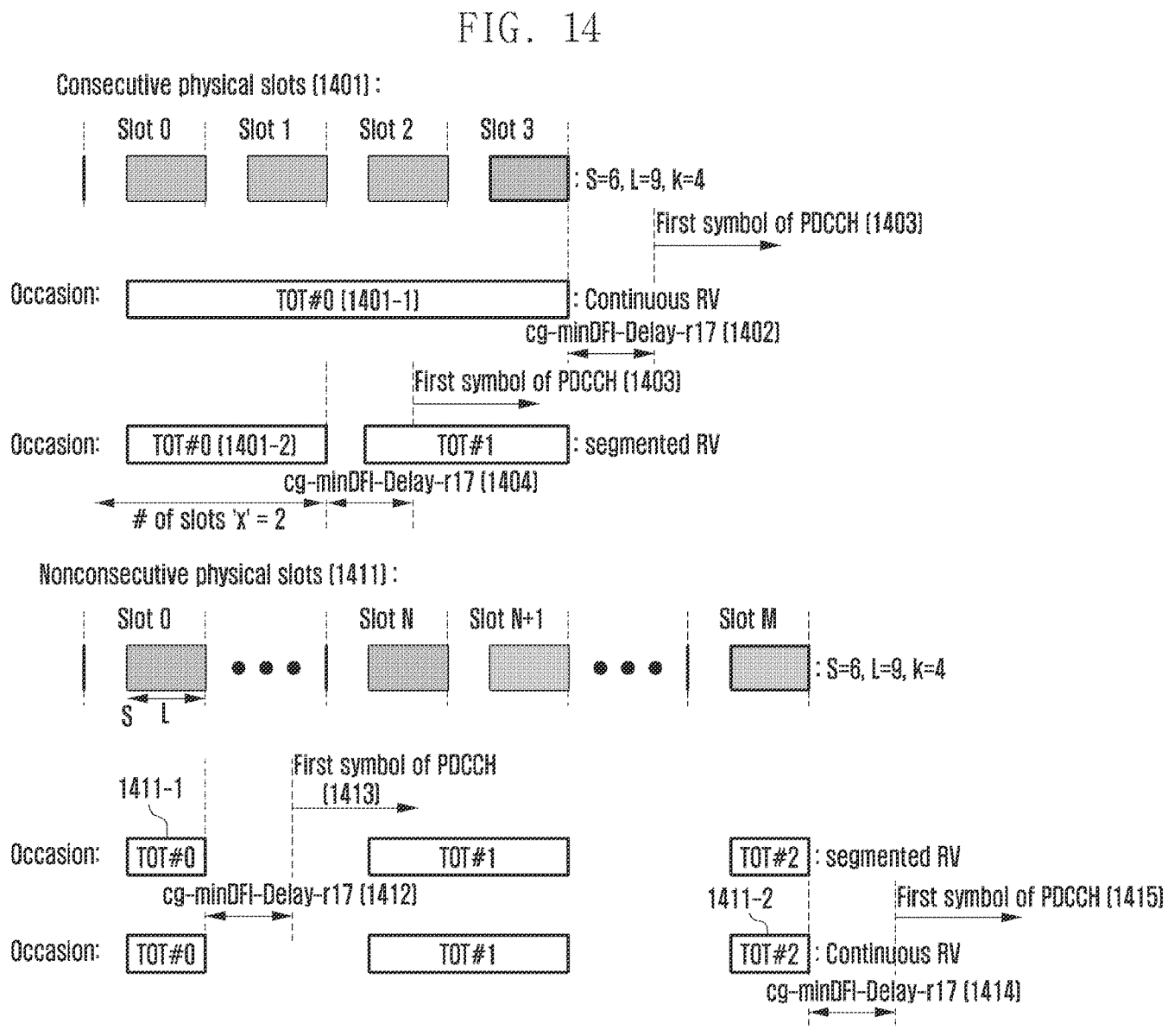

FIG. 14 is a diagram for explaining the operation of determining the validity of HARQ-ACK information for TBoMS transmission in a 5G system.

Figure 15A:
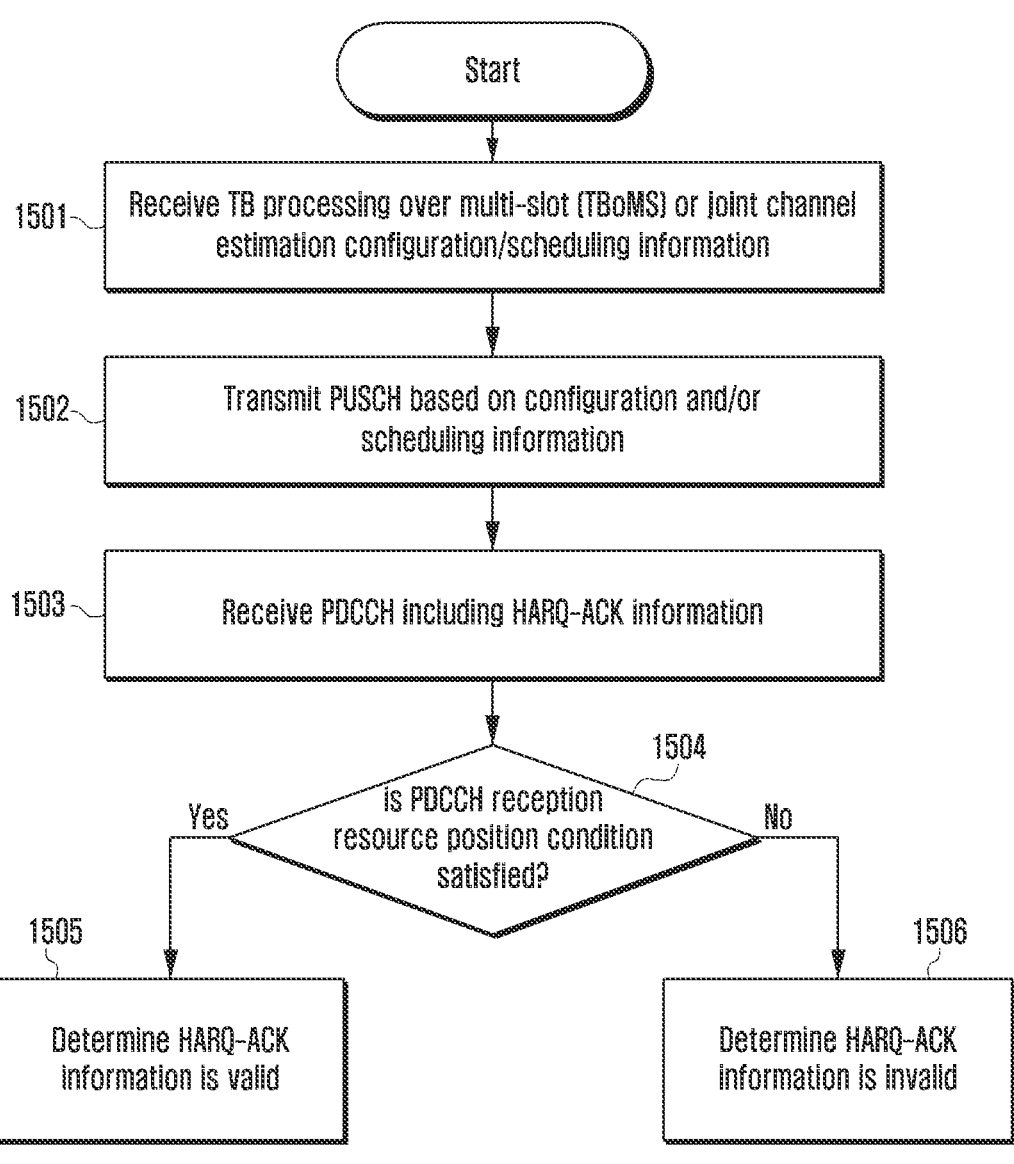

FIG. 15A is a flowchart for explaining the operation of a terminal that determines the validity of HARQ-ACK feedback information for multi-slot PUSCH transmission (TBoMS) consisting of one TB and/or PUSCH transmission in which joint channel estimation is performed.

Figure 15B:
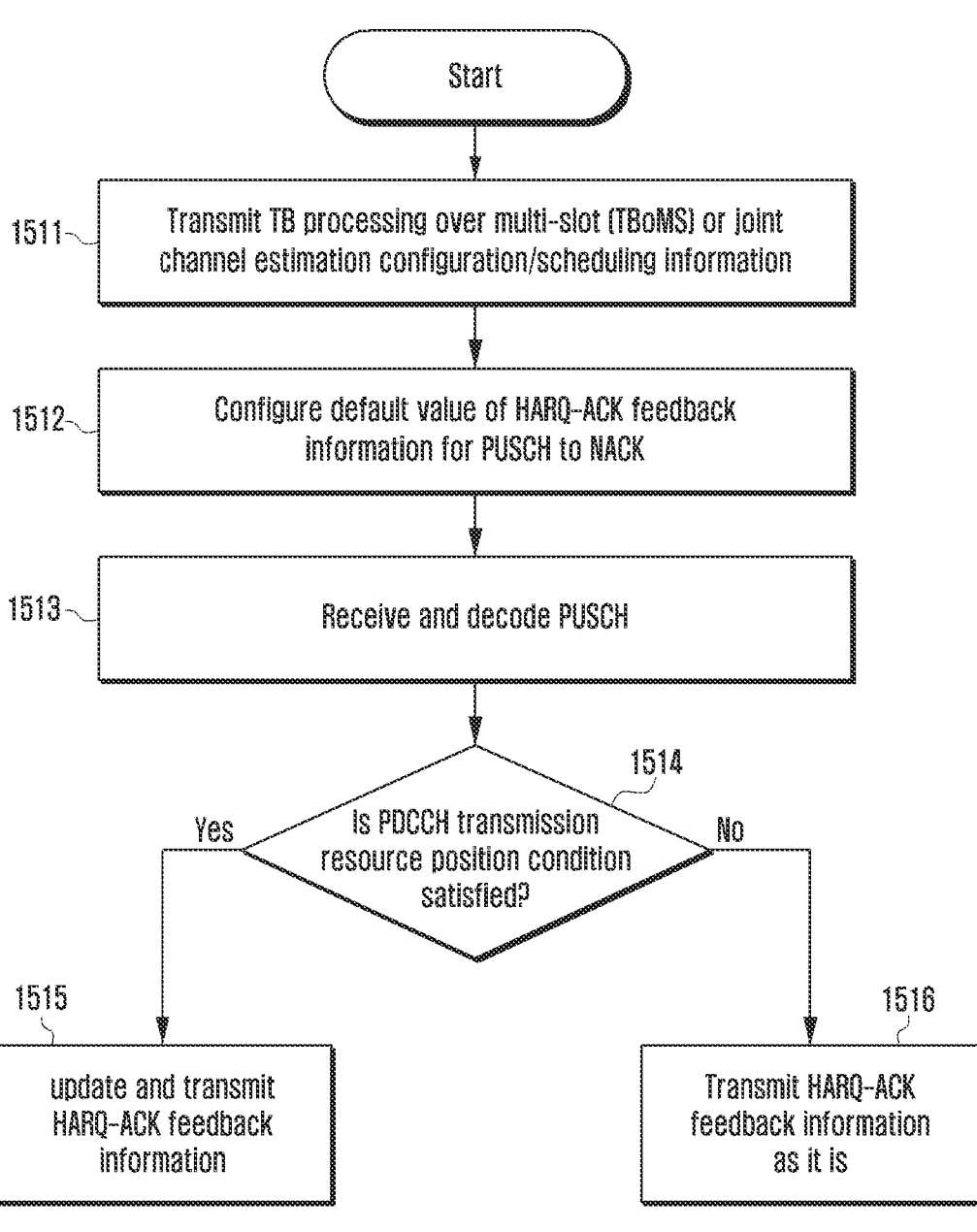

FIG. 15B is a flowchart for explaining the operation of a base station that transmits HARQ-ACK feedback for multi-slot PUSCH transmission (TBoMS) consisting of one TB and/or PUSCH transmission in which joint channel estimation is performed.

Figure 16:
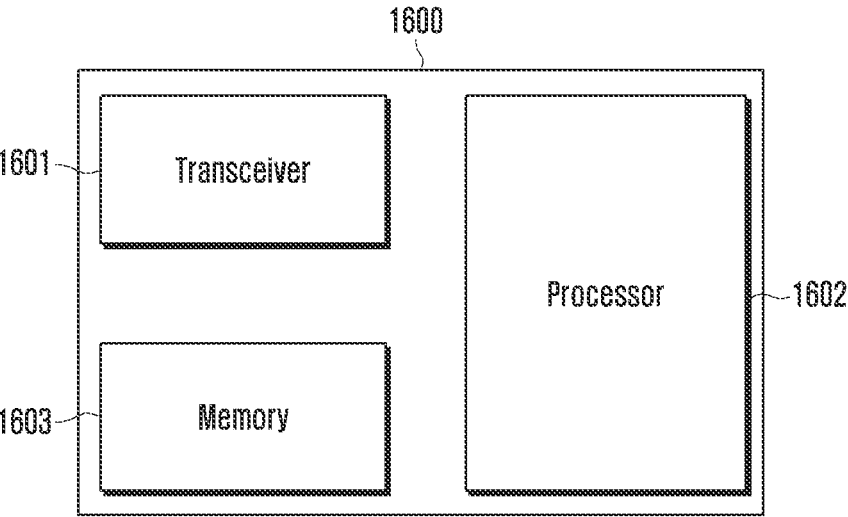

FIG. 16 is a block diagram of a terminal according to an embodiment of the disclosure.

Figure 17:
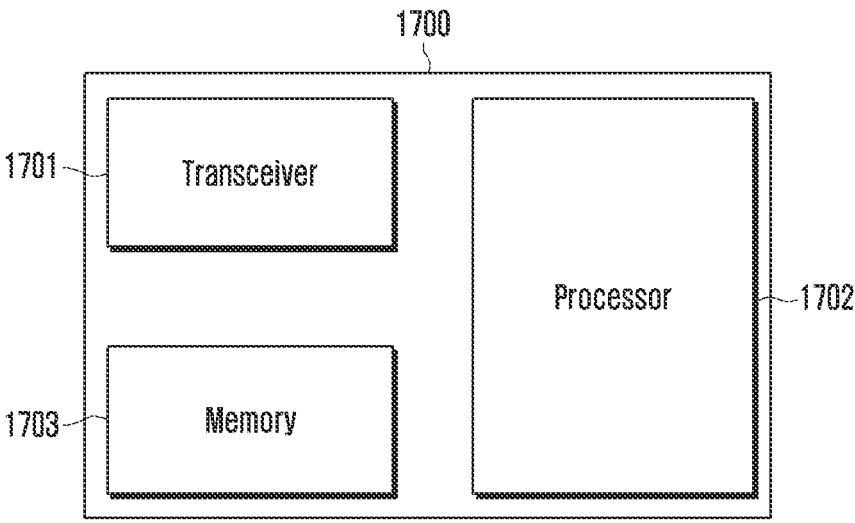

FIG. 17 is a block diagram of a base station according to an embodiment of the disclosure.

MODE FOR THE INVENTION

Hereinafter, embodiments of the disclosure will be described in detail with reference to the accompanying drawings. In the following, in describing the embodiments, a description of techniques known to those skilled in the art and not directly related to the disclosure may be omitted. Such unnecessary omission of description is intended to prevent obscuring the main concepts of the disclosure and to more clearly convey the main concepts.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

Advantages and features of the disclosure and methods of accomplishing the same may be understood more readily by reference to the following detailed description of the embodiments of the disclosure and the accompanying drawings. However, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements. In addition, while describing the disclosure, detailed description of related well-known functions or constitutions may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Hereinafter, a base station is an entity that allocates resources to a terminal and may be at least one of a gNode B, an eNode B, a node B, a base station (BS), a radio access unit, a base station controller, and a node on a network. A terminal may include a user equipment (UE), a mobile station (MS), a cellular phone, a smartphone, a computer, or a multimedia system capable of performing a communication function. In the disclosure, a downlink (DL) denotes a wireless transmission path of a signal transmitted by a base station to a terminal, and an uplink (UL) denotes a wireless transmission path of a signal transmitted by a terminal to a base station. Also, while embodiments of the disclosure are described by using a long-term evolution (LTE) or longer term evolution-advanced (LTE-A) system as an example, the embodiments of the disclosure may also be applied to other communication systems having a similar technical background or channel form. For example, 5th generation (5G) new radio (NR) mobile communication technology developed after LTE-A may belong thereto, and hereinafter, 5G may be indicated as a concept including existing LTE, LTE-A, and other similar services. Also, the disclosure may be applied to other communication systems through some modifications without departing from the scope of the disclosure by the judgment of one of ordinary skill in the art.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term 'unit' is not limited to software or hardware. The 'unit' may be constituted so as to be in an addressable storage medium, or may be constituted so as to operate one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'. Furthermore, the components and 'units' may be embodied to reproduce one or more central processing units (CPUs) in a device or security multimedia card. Also, in the embodiments, the 'unit' may include at least one processor.

Hereinafter, embodiments of the disclosure will be described in detail with reference to the accompanying drawings. Hereinafter, a method and apparatus proposed in the embodiment of the disclosure describe the embodiment of the disclosure as an example for improving PUSCH coverage, are not limited to each embodiment, and can be utilized for a frequency resource configuration method corresponding to another channel by using all of one or more embodiments proposed in the disclosure or a combination of some embodiments. Accordingly, the embodiments of the disclosure may be applied through some modifications within a range that does not significantly deviate from the scope of the disclosure as determined by those skilled in the art.

In addition, while describing the disclosure, detailed description of related well-known functions or constitutions may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Wireless communication systems have been developed from early wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and 802.17e of IEEE.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (eNodeB (eNB) or BS), and the DL refers to a wireless link through which a base station transmits data or a control signal to a terminal. Also, the multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a communication system after the LTE system, a 5G communication system should support services satisfying various requirements at the same time, so as to freely reflect various requirements of a user and a service provider. The services considered for the 5G communication system include enhanced mobile broadband (eMBB), massive machine-type communication (mMTC), ultra-reliability low latency communication (URLLC), and the like.

eMBB aims to provide a further enhanced data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multi input multi output (MIMO) transmission technology is needed. In addition, signals are transmitted using a transmission bandwidth of up to 20 MHz in a 2 GHz band used by the LTE system, but the 5G communication system uses a bandwidth wider than 20 MHz in a frequency band of 3 to 6 GHz or more than 6 GHz, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km2) in a cell because it is attached to various sensors and devices to provide communication functions. In addition, since the terminals supporting mMTC are more likely to be positioned in shaded areas not covered by a cell, such as a basement of a building due to nature of services, the terminals require a wider coverage than other services provided by the 5G communication system. The terminals that support mMTC should be constituted as inexpensive terminals and require very long battery life-time, such as 10 to 16 years, because it is difficult to frequently replace batteries of the terminals.

Finally, URLLC is a cellular-based wireless communication service used for mission-critical purposes. For example, URLLC may consider a service used in remote control for robots or machinery, industrial automation, unmanned aerial vehicles, remote health care, or emergency alerts. Accordingly, communication provided by URLLC should provide very low latency and very high reliability. For example, URLLC-supportive services need to meet an air interface latency of less than 0.5 milliseconds and simultaneously include requirements of a packet error rate of 10-5 or less. Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the 5G communication system (hereinafter, interchangeably used with 5G system) may be multiplexed in one system and may be transmitted. In this case, the services may use different transmission/reception techniques and transmission/reception parameters in order to satisfy different requirements.

A frame structure of a 5G system will be described in more detail with reference to the drawings.

Figure 1:
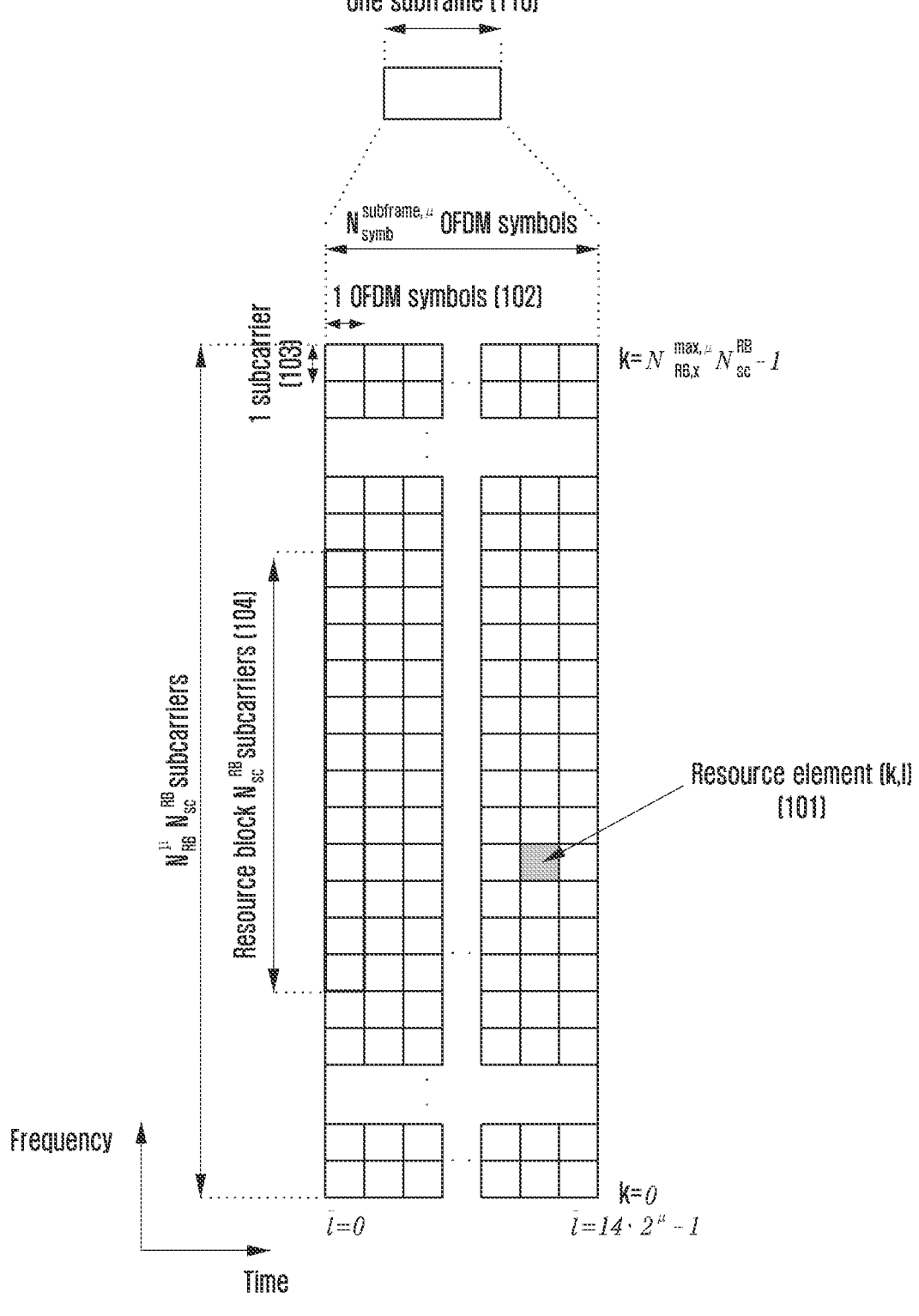
FIG. 1 is a diagram illustrating a basic structure of a time-frequency domain that is a radio resource domain in which data or a control channel is transmitted in a 5G system.

FIG. 1 is a diagram illustrating a basic structure of a time-frequency domain that is a radio resource domain in a 5G system.

In FIG. 1, a horizontal axis represents a time domain, and a vertical axis represents a frequency domain. A basic resource unit in a time-frequency domain is a resource element (RE) 101, and may be defined by one orthogonal frequency division multiplexing (OFDM) symbol (or discrete Fourier transform spread OFDM (DFT-s-OFDM) symbol) 102 along a time axis and one subcarrier 103 along a frequency axis. In the frequency domain, $$N_{sc}^{RB}$$

(e.g., 12) consecutive REs may constitute one resource block (RB) 104. In addition, In the time domain, $$N_{symb}^{subframe}$$

consecutive OFDM symbols may constitute one subframe 110.

Figure 2:
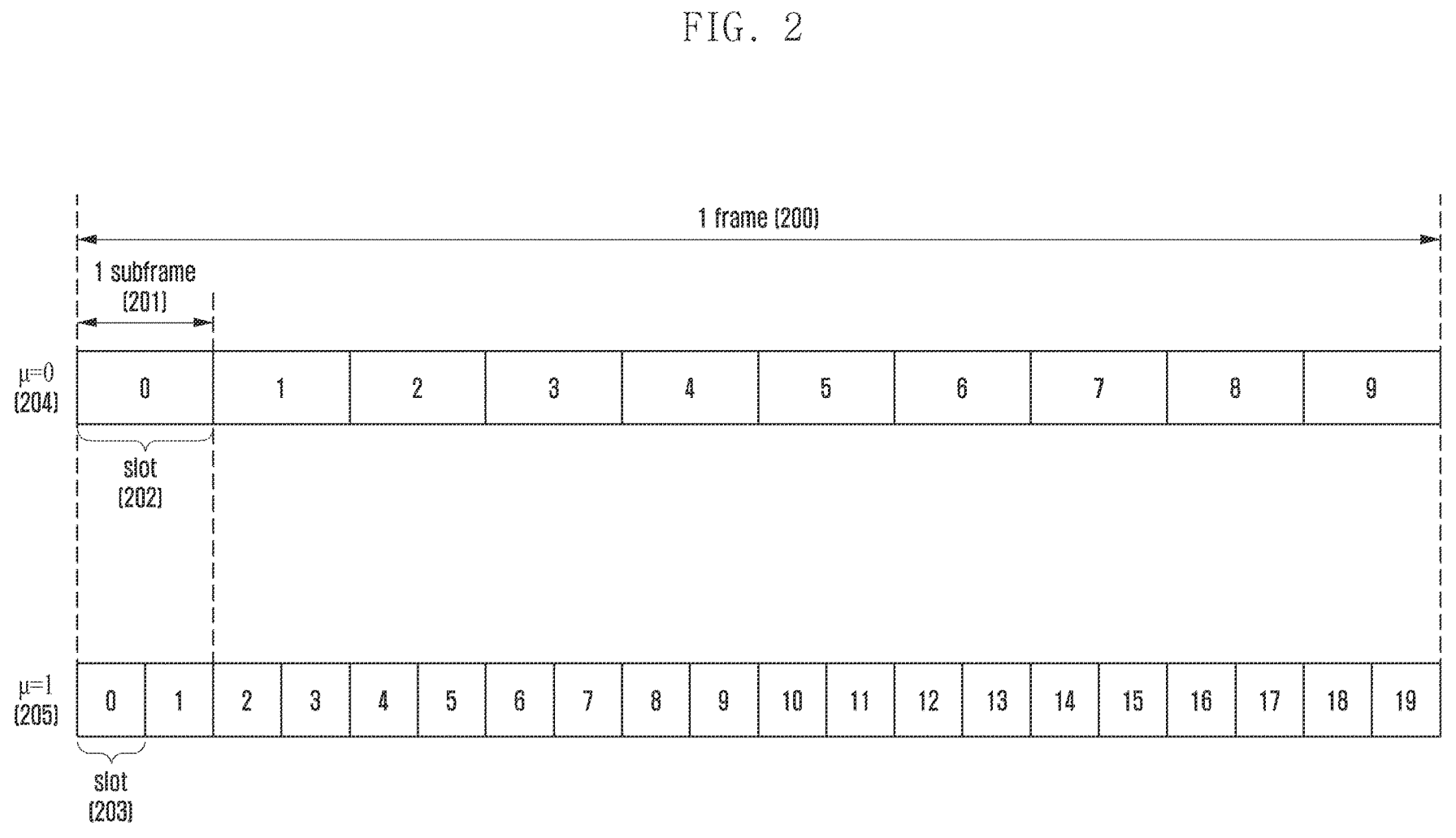

FIG. 2 is a diagram illustrating a slot structure considered in a 5G system.

In FIG. 2, structures of a frame 200, a subframe 201, and a slot 202 are illustrated. One frame 200 may be defined as 10 ms. One subframe 201 may be defined as 1 ms, and thus, one frame 200 may include a total of 10 subframes 201. In addition, one slot 202 or 203 may be defined as 14 OFDM symbols (i.e., the number of symbols per slot $$N_{symb}^{slot} = 14).$$

One subframe 201 may include one or a plurality of slots 202 or 203, and the number of slots 202 or 203 per subframe 201 may vary according a subcarrier spacing configuration value μ (204 and 205).

FIG. 2 illustrates a slot structure in a case where the subcarrier spacing configuration value μ is 0 (204) and a case where the subcarrier spacing configuration value μ is 1 (205). In the case of μ=0 (204), one subframe 201 may include one slot 202, and in the case of μ=1 (205), one subframe 201 may include two slots 203. That is, the number of slots per subframe $$N_{slot}^{subframe,\mu}$$

may vary according to the subcarrier spacing configuration value μ, and the number of slots per frame $$N_{slot}^{frame,\mu}$$

may accordingly vary. Accordingly, $$N_{slot}^{subframe,\mu}$$

and $$N_{slot}^{frame,\mu}$$

according to each subcarrier spacing configuration value μ may be defined as in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS) which is one of reference signals in a 5G system will be described in detail.

The DMRS may include a plurality of DMRS ports, and the respective ports maintain orthogonality so as not to interfere with one another by using code division multiplexing (CDM) or frequency division multiplexing (FDM). However, the term "DMRS" may be expressed by other terms according to user's intention and a using purpose of a reference signal. More specifically, the term "DMRS" merely suggests a specific example in order to easily explain technical features of the disclosure and to assist in understanding of the disclosure, and is not intended to limit the scope of the disclosure. That is, it is obvious to a person skilled in the art that the term is applicable to a reference signal which is based on the technical concept of the disclosure.

Figure 3:
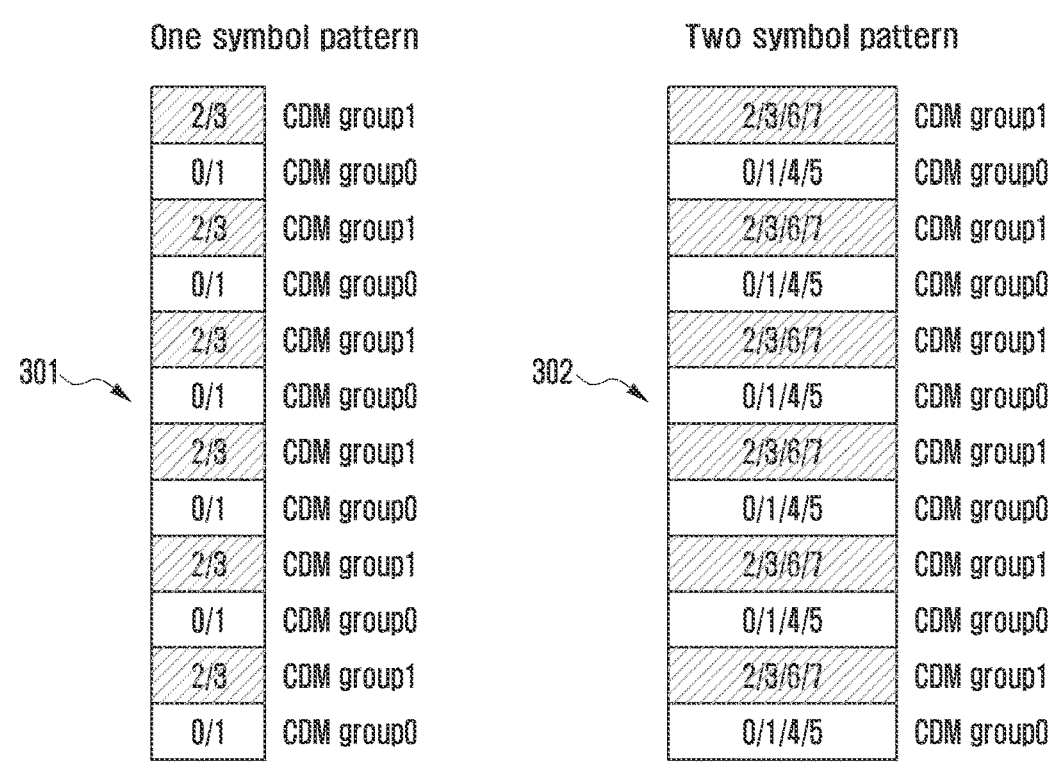
FIG. 3 is a diagram illustrating DMRS patterns (type1 and type2) used for communication between a base station and a terminal in a 5G system.

FIG. 3 is a diagram illustrating a DMRS pattern (type 1 and type 2) used for communication between a base station and a terminal in a 5G system.

In the 5G system, two DMRS patterns may be supported. FIG. 3 illustrates two DMRS patterns in detail. With reference to FIG. 3, a first symbol pattern 301 and a second symbol pattern 302 indicate DMRS type 1. The first symbol pattern 301 and the second symbol pattern 302 of DMRS type 1 in FIG. 3 are DMRS patterns of a structure of comb 2, and may be configured with two CDM groups, and different CDM groups may undergo frequency division multiplexing (FDM).

In the first symbol pattern 301 in FIG. 3, CDM on a frequency may be applied to the same CDM group, thereby distinguishing between two DMRS ports, and accordingly, 4 orthogonal DMRS ports in total may be configured. In the first symbol pattern 301 in FIG. 3, DMRS port IDs mapped onto the respective CDM groups are illustrated (in the case of a downlink, +1000 is given to the illustrated numbers and is displayed to indicate the DMRS port ID). In the second symbol pattern 302 in FIG. 3, CDM on time/frequency may be applied to the same CDM group, thereby distinguishing four DMRS ports, and accordingly, 8 orthogonal DMRS ports in total may be configured. In the second symbol pattern 302 in FIG. 3, DMRS port IDs mapped onto the respective CDM groups are illustrated (in the case of a downlink. +1000 is given to the illustrated numbers and is displayed to indicate the DMRS port ID).

DMRS type 2 of a first symbol pattern 303, a second symbol pattern 304 in FIG. 3 is a DMRS pattern of a structure where frequency domain orthogonal cover codes (FD-OCC) are applied to adjacent subcarriers on a frequency, and may be configured with three CDM groups, and different CDM groups may undergo FDM.

In the first symbol pattern 303 in FIG. 3, CDM on a frequency may be applied to the same CDM group, thereby distinguishing between two DMRS ports, and accordingly, 6 orthogonal DMRS ports in total may be configured. In the first symbol pattern 303 in FIG. 3, DMRS port IDs mapped onto the respective CDM groups are illustrated (in the case of a downlink, +1000 is given to the illustrated numbers and is displayed to indicate the DMRS port ID). In the second symbol pattern 304 in FIG. 3, CDM on time/frequency may be applied to the same CDM group, thereby distinguishing four DMRS ports, and accordingly, 12 orthogonal DMRS ports in total may be configured. In the second symbol pattern 304 in FIG. 3, DMRS port IDs mapped onto the respective CDM groups are illustrated (in the case of a downlink. +1000 is given to the illustrated numbers and is displayed to indicate the DMRS port ID).

As described above, in an NR system, two different DMRS patterns (the first symbol pattern 301 and the second symbol pattern 302, or the first symbol pattern 303 and the second symbol pattern 304 in FIG. 3) may be configured, and it may be configured whether a DMRS pattern is one symbol pattern 301, 303 or the adjacent two symbol pattern 302 or 304. In addition, in the NR system, DMRS port numbers may be scheduled, and also, the number of CDM groups scheduled all together may be configured and signaled for the sake of PDSCH rate matching. In addition, in the case of cyclic prefix based orthogonal frequency division multiplex (CP-OFDM), the two DMRS patterns described above may be supported in the DL and the UL, and, in the case of DFT-S-OFDM, only DMRS type 1 among the above-described DMRS patterns may be supported in the UL. In addition, an additional DMRS may be supported to be configured. A front-loaded DMRS may indicate a first DMRS that is positioned in a head symbol in time, and an additional DMRS may indicate a DMRS that is positioned in a symbol after the front-loaded DMRS. In the NR system, the number of additional DMRSs may be configured to at least 0 and at most 3. In addition, when the additional DMRS is configured, the same pattern as the front-loaded DMRS may be assumed. More specifically, when information regarding whether the DMRS pattern type of the front-loaded DMRS is type 1 or type 2, information regarding whether the DMRS pattern is one symbol pattern or the adjacent two symbol pattern, and information of the number of CDM groups used along with the DMRS port are indicated, and in case where an additional DMRS is additionally configured, it may be assumed that, for the additional DMRS, the same DMRS information as the front-loaded DMRS is configured.

More specifically, the above-described downlink DMRS configuration may be configured through radio resource control (RRC) signaling as shown in Table 2 presented below.

TABLE 2

```
DMRS-DownlinkConfig ::= SEQUENCE {
dmrs-Type (DMRS type configuration) ENUMERATED {type2} OPTIONAL, -- Need
S
dmrs-AdditionalPosition (additional DMRS OFDM symbol configuration)
ENUMERATED {pos0, pos1, pos3} OPTIONAL, -- Need S
maxLength (1 symbol or 2symbol DMRS pattern related configuration)
ENUMERATED {len2} OPTIONAL, -- Need S
scramblingID0 (scrambling ID0) INTEGER (0..65535) OPTIONAL, -- Need S
scramblingID1 (scrambling ID1) INTEGER (0..65535) OPTIONAL, -- Need S
phaseTrackingRS (PTRS configuration) SetupRelease { PTRS-DownlinkConfig }
OPTIONAL, -- Need M
...
}
```

In addition, the above-described uplink DMRS configuration may be configured through RRC signaling as shown in Table 3 presented below.

TABLE 3

```
DMRS-UplinkConfig ::= SEQUENCE {
dmrs-Type (DMRS type configuration) ENUMERATED {type2} OPTIONAL, -- Need
S
dmrs-AdditionalPosition (additional DMRS OFDM symbol configuration)
ENUMERATED {pos0, pos1, pos3} OPTIONAL, -- Need R
phaseTrackingRS (PTRS configuration) SetupRelease { PTRS-UplinkConfig }
OPTIONAL, -- Need M
maxLength (1 symbol or 2symbol DMRS pattern related configuration)
ENUMERATED
{len2} OPTIONAL, -- Need S
transformPrecodingDisabled SEQUENCE {
scramblingID0 (scrambling ID0) INTEGER (0..65535) OPTIONAL, -- Need S
scramblingID1 (scrambling ID0) INTEGER (0..65535) OPTIONAL, -- Need S
...
} OPTIONAL, -- Need R
transformPrecodingEnabled SEQUENCE {
nPUSCH-Identity (cell ID for DFT-s-OFDM) INTEGER(0..1007) OPTIONAL, --
Need S
sequenceGroupHopping (sequence group hopping) ENUMERATED {disabled}
OPTIONAL, -- Need S
sequenceHopping (sequence hopping) ENUMERATED {enabled} OPTIONAL, --
Need S
...
} OPTIONAL, -- Need R
...
}
```

Figure 4:
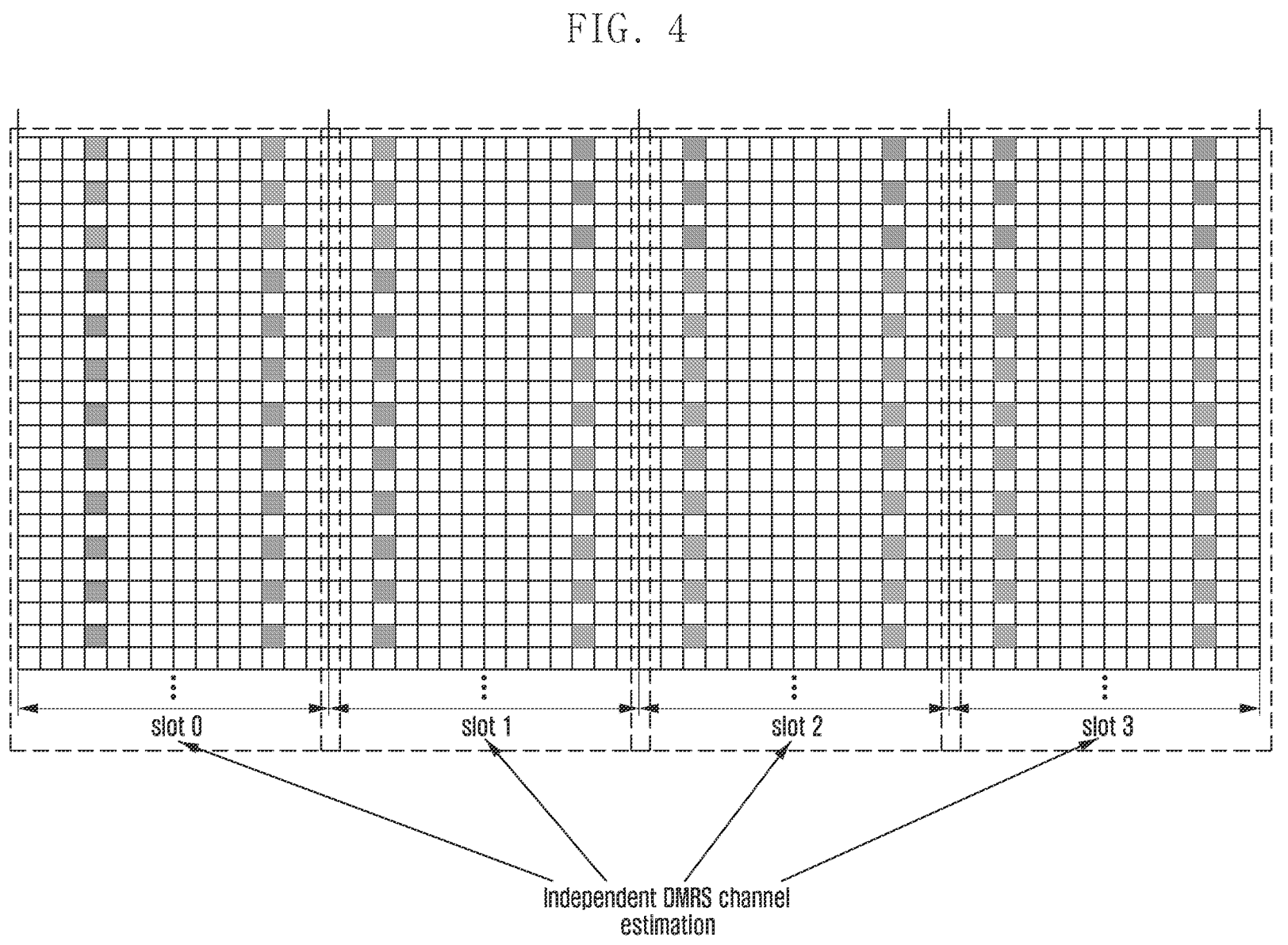

FIG. 4 is a diagram illustrating an example of channel estimation which uses a DMRS received through one PUSCH in a time band in a 5G system.

In performing channel estimation for decoding data by using the above-described DMRS, physical resource blocks (PRB) bundling interlocking with a system band may be used in a frequency band and channel estimation may be performed within a precoding resource block group which is a corresponding bundling unit. In addition, channel estimation may be performed on a time basis on the assumption that only the DMRS received through one PUSCH undergoes the same precoding.

Figure 5:
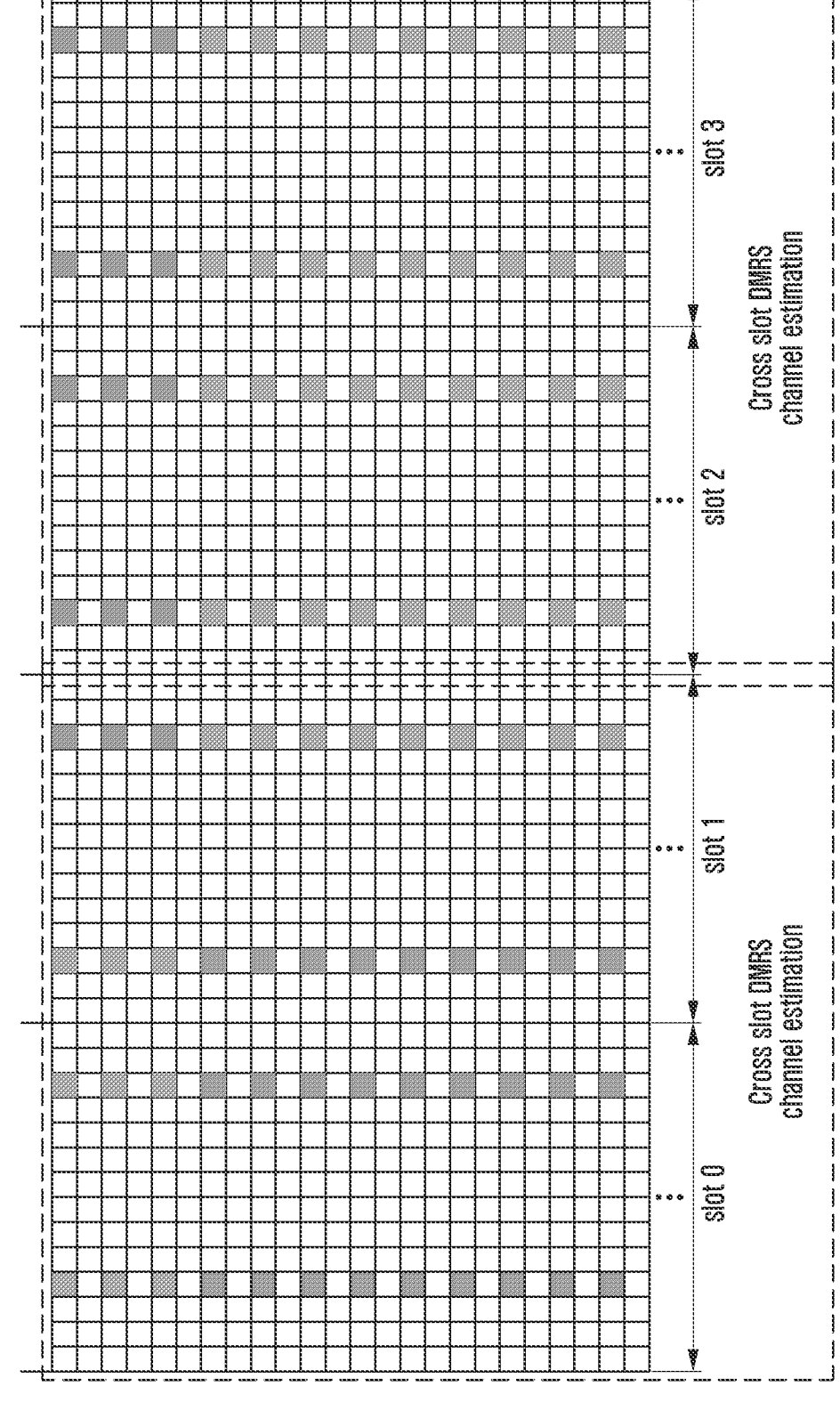
FIG. 5 is a diagram illustrating an example of joint channel estimation which uses a DMRS received through a plurality of PUSCHs in a time band in a 5G system.

FIG. 5 is a diagram illustrating an example of joint channel estimation which uses a DMRS received through a plurality of PUSCHs in a time band in a 5G system to which the disclosure is applicable.

A base station may indicate whether a terminal uses the same precoding through a configuration, and, based on this indication, the base station may perform channel estimation by using DMRS transmissions using the same precoding, and may enhance DMRS channel estimation performance.

In the same way as in FIG. 4, in performing channel estimation for decoding data by using the above-described DMRS in FIG. 5, PRB bundling interlocking with a system band may be used in a frequency band, and channel estimation may be performed within a precoding resource block group (PRG) which is a corresponding bundling unit. In addition, channel estimation may be performed on a time basis on the assumption that the precoding of only the DMRS received through one or more PUSCHs is the same. Accordingly, since it is possible to perform channel estimation based on various DMRSs in the time band, channel estimation performance may be enhanced. In particular, even when data decoding performance is good, channel estimation performance may encounter a bottleneck in enhancing a coverage, and therefore, channel estimation performance may be very important.

Hereinafter, a time domain resource allocation method for a data channel in a 5G communication system will be described. A base station may configure a table regarding time domain resource allocation information for a downlink data channel (physical downlink shared channel (PDSCH)) and an uplink data channel (physical uplink shared channel (PUSCH)) for a terminal through higher layer signaling (for example, RRC signaling).

The base station may configure a table that is formed of at most 17 (=maxNrofDL-Allocations) entries for the PDSCH, and may configure a table that is formed of at most 17 (=maxNrofUL-Allocations) entries for the PUSCH. The time domain resource allocation information may include, for example, a PDCCH-to-PDSCH slot timing (corresponding to a time interval in a slot unit between a time at which a PDCCH (physical downlink control channel) is received and a time at which a PDSCH scheduled by the received PDCCH is transmitted, expressed by K0), or a PDCCH-to-PUSCH slot timing (corresponding to a time interval in a slot unit between a time at which a PDCCH is received and a time at which a PUSCH scheduled by the received PDCCH is transmitted, expressed by K2), information regarding a position and length of a start symbol in which the PDSCH or PUSCH is scheduled within a slot, a mapping type of the PDSCH or PUSCH. For example, time domain resource allocation information regarding the PDSCH may be configured for the terminal through RRC signaling as shown in Table 4 below.

TABLE 4

PDSCH-TimeDomainResourceAllocationList information element
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
k0 INTEGER(0..32) OPTIONAL, -- Need S
(PDCCH-to-PDSCH timing, slot unit)
mappingType ENUMERATED {typeA, typeB},
(PDSCH mapping type)
startSymbolAndLength INTEGER (0..127)
(start symbol and length of PDSCH)
}

In addition, for example, time domain resource allocation information regarding the PUSCH may be configured for the terminal through RRC signaling as shown in Table 5 below.

TABLE 5

PUSCH-TimeDomainResourceAllocation information element
PUSCH-TimeDomainResourceAllocationList ::= SEQUENCE
(SIZE(1..maxNrofUL-Allocations)) OF PUSCH-
TimeDomainResourceAllocation TABLE 5-continued PUSCH-TimeDomainResourceAllocation ::= SEQUENCE {
k2 INTEGER(0..32) OPTIONAL, -- Need S
(PDCCH-to-PUSCH timing, slot unit)
mappingType ENUMERATED {typeA, typeB},
(PUSCH mapping type)
startSymbolAndLength INTEGER (0..127)
(start symbol and length of PUSCH)
}

The base station may transmit one of the entries of the table regarding the time domain resource allocation information to the terminal through L1 signaling (for example, downlink control information (DCI)) (for example, the base station may indicate one of the entries of the table, with a 'time domain resource allocation' field in the DCI). The terminal may acquire the time domain resource allocation information regarding the PDSCH or PUSCH, based on the DCI received from the base station.

Hereinafter, transmission of a PUSCH in a 5G system will be described in detail. The PUSCH transmission may be dynamically scheduled by a UL grant within DCI, or may be operated by configured grant type 1 or configured grant type 2. The dynamic scheduling for the PUSCH transmission may be indicated by DCI format 0_0 or 0_1.

The PUSCH transmission of configured grant type 1 may be configured semi-statically through reception of configuredGrantConfig including rrc-ConfiguredUplinkGrant of Table 6 through higher signaling, without receiving a UL grant within DCI. The PUSCH transmission of configured grant type 2 may be scheduled semi-continuously by a UL grant in DCI, after reception of configuredGrantConfig that does not include rrc-ConfiguredUplinkGrant of Table 6 through higher signaling. In case where PUSCH transmission is operated by a configured grant, parameters applied to the PUSCH transmission may be applied through configuredGrantConfig which is higher signaling of Table 6, except for specific parameters provided in pusch-Config of Table 7, which is higher signaling (for example, dataScramblingIdentityPUSCH, txConfig, codebookSubset, maxRank, scaling of UCI-OnPUSCH, etc.). For example, if the terminal receives transformPrecoder in configuredGrantConfig which is higher signaling of Table 6, the terminal may apply tp-pi2BPSK in pusch-Config of Table 7 to PUSCH transmission operating by a configured grant.

TABLE 6

ConfiguredGrantConfig
ConfiguredGrantConfig ::= SEQUENCE
frequency Hopping ENUMERATED {intraSlot, interSlot} OPTIONAL, -- Need
S,
cg-DMRS-Configuration DMRS-UplinkConfig,
mcs-Table ENUMERATED {qam256, qam64LowSE} OPTIONAL, -- Need S
mcs-TableTransformPrecoder ENUMERATED {qam256, qam64LowSE}
OPTIONAL, -- Need S
uci-OnPUSCH SetupRelease { CG-UCI-OnPUSCH } OPTIONAL, -- Need M
resourceAllocation ENUMERATED { resourceAllocationType0,
resourceAllocationType1, dynamicSwitch },
rbg-Size ENUMERATED {config2} OPTIONAL, -- Need S
powerControlLoopToUse ENUMERATED {n0, n1},
p0-PUSCH-Alpha P0-PUSCH-AlphaSetId,
transformPrecoder ENUMERATED {enabled, disabled} OPTIONAL, -- Need
S
nrofHARQ-Processes INTEGER(1..17),
repK ENUMERATED {n1, n2, n4, n8},
repK-RV ENUMERATED {s1-0231, s2-0303, s3-0000} OPTIONAL, -- Need
R
periodicity ENUMERATED {
sym2, sym7, sym1x14, sym2x14, sym4x14, sym5x14, sym8x14, sym10x14,
sym17x14, sym20x14,
sym32x14, sym40x14, sym64x14, sym80x14, sym128x14, sym170x14, TABLE 6-continued

```
sym256x14, sym320x14, sym512x14,
sym640x14, sym1024x14, sym1280x14, sym2560x14, sym5120x14,
sym6, sym1x12, sym2x12, sym4x12, sym5x12, sym8x12, sym10x12,
sym17x12, sym20x12, sym32x12,
sym40x12, sym64x12, sym80x12, sym128x12, sym170x12, sym256x12,
sym320x12, sym512x12, sym640x12,
sym1280x12, sym2560x12
    },
configuredGrantTimer INTEGER (1..64) OPTIONAL, -- Need R
rrc-ConfiguredUplinkGrant SEQUENCE {
timeDomainOffset INTEGER (0..5119),
timeDomainAllocation INTEGER (0..16),
frequencyDomainAllocation BIT STRING (SIZE(18)),
antennaPort INTEGER (0..31),
dmrs-SeqInitialization INTEGER (0..1) OPTIONAL, -- Need R
precodingAndNumberOfLayers INTEGER (0..63),
srs-ResourceIndicator INTEGER (0..16) OPTIONAL, -- Need R
mcsAndTBS INTEGER (0..31),
frequency HoppingOffset INTEGER (1..maxNrofPhysicalResourceBlocks-
1) OPTIONAL, -- Need R
pathlossReferenceIndex INTEGER (0..maxNrofPUSCH-
PathlossReferenceRSs-1),
...
} OPTIONAL, -- Need R
...
}
```

Next, a PUSCH transmission method will be described. A DMRS antenna port for PUSCH transmission may be the same as an antenna port for SRS transmission. The PUSCH transmission may follow a codebook-based transmission method and a non-codebook-based transmission method according to whether a value of txConfig in pusch-Config of Table 7, which is higher signaling, indicates a 'codebook' or a 'non-codebook'. As described above, PUSCH transmission may be dynamically scheduled through DCI format 0_0 or 0_1, and may be semi-statically configured by a configured grant.

If a terminal receives an indication of scheduling of PUSCH transmission through DCI format 0_0, the terminal may perform beam configuration for PUSCH transmission by using pucch-spatialRelationInfoID corresponding to a UE-specific, dedicated PUCCH resource having a lowest ID within an uplink bandwidth part (BWP) activated in a serving cell. In this case, the PUSCH transmission may be performed based on a single antenna port. The terminal may not expect scheduling for PUSCH transmission through DCI format 0_0 within a BWP in which a PUCCH resource including pucch-spatialRelationInfo is not configured. If the terminal does not receive a configuration of txConfig in pusch-Config of Table 7, the terminal may not expect scheduling with DCI format 0_1.

TABLE 7

```
PUSCH-Config
PUSCH-Config ::= SEQUENCE {
dataScramblingIdentityPUSCH INTEGER (0..1023) OPTIONAL, -- Need S
txConfig ENUMERATED {codebook, nonCodebook} OPTIONAL, -- Need
S
dmrs-UplinkForPUSCH-MappingTypeA SetupRelease { DMRS-UplinkConfig
} OPTIONAL, -- Need M
dmrs-UplinkForPUSCH-MappingTypeB SetupRelease { DMRS-UplinkConfig
} OPTIONAL, -- Need M
pusch-PowerControl PUSCH-PowerControl OPTIONAL, -- Need M
frequency Hopping ENUMERATED {intraSlot, interSlot} OPTIONAL, -- Need
S
frequency HoppingOffsetLists SEQUENCE (SIZE (1..4)) OF INTEGER (1..
maxNrofPhysicalResourceBlocks-1) OPTIONAL, -- Need M
resourceAllocation ENUMERATED { resource AllocationType0,
resourceAllocationType1, dynamicSwitch},
pusch-TimeDomainAllocationList SetupRelease {
PUSCH-TimeDomainResourceAllocationList } OPTIONAL, -- Need M
pusch-AggregationFactor ENUMERATED { n2, n4, n8 } OPTIONAL, --
Need S
mcs-Table ENUMERATED {qam256, qam64LowSE} OPTIONAL, -- Need
S
mcs-TableTransformPrecoder ENUMERATED {qam256, qam64LowSE}
OPTIONAL, -- Need S
transformPrecoder ENUMERATED {enabled, disabled} OPTIONAL, -- Need
S
codebookSubset ENUMERATED {fully AndPartialAndNonCoherent,
partialAndNonCoherent, nonCoherent}
OPTIONAL, -- Cond codebookBased
maxRank INTEGER (1..4) OPTIONAL, -- Cond codebookBased
rbg-Size ENUMERATED { config2} OPTIONAL, -- Need S
uci-OnPUSCH SetupRelease { UCI-OnPUSCH} OPTIONAL, -- Need M
```

TABLE 7-continued tp-pi2BPSK ENUMERATED {enabled} OPTIONAL, -- Need S

...

}

Next, codebook-based PUSCH transmission will be described. The codebook-based PUSCH transmission may be dynamically scheduled through DCI format 0_0 or 0_1, and may be semi-statically operated by a configured grant. When codebook-based PUSCH transmission is dynamically scheduled through DCI format 0_1 or is semi-statically configured by a configured grant, the terminal may determine a precoder for PUSCH transmission, based on an SRS resource indicator (SRI), a transmission precoding matrix indicator (TPMI), and a transmission rank (that is, the number of PUSCH transmission layers).

In this case, the SRI may be given through a field SRS resource indicator within DCI or may be configured through srs-ResourceIndicator which is higher signaling. The terminal may receive a configuration of at least one SRS resource at the time of codebook-based PUSCH transmission, and for example, may receive a configuration of at most two SRS resources. In case where the terminal receives an SRI through DCI, an SRS resource indicated by the corresponding SRI may refer to an SRS resource corresponding to the SRI, among SRS resources transmitted earlier than a PDCCH including the corresponding SRI. In addition, the TPMI and the transmission rank may be given through field precoding information and the number of layers in DCI, or may be configured through precodingAndNumberOfLayers which is higher signaling. The TPMI may be used to indicate a precoder which is applied to PUSCH transmission.

The precoder to be used for PUSCH transmission may be selected from an uplink codebook that has the same number of antenna ports as an nrofSRS-Ports value in SRS-Config, which is higher signaling. In the codebook-based PUSCH transmission, the terminal may determine a codebook subset based on the TPMI and codebookSubset within pusch-Config which is higher signaling. In this case, codebook-Subset in pusch-Config which is higher signaling may be configured to one of 'fully AndPartialAndNonCoherent', 'partialAndNonCoherent', and 'nonCoherent', based on a UE capability of the terminal to report to the base station by the terminal.

If the terminal reports 'partialAndNonCoherent' with the UE capability, the terminal may not expect that the value of codebookSubset which is higher signaling is configured to 'fully AndPartialAndNonCoherent.' In addition, if the terminal reports 'nonCoherent' with the UE capability, the terminal may not expect that the value of codebookSubset which is higher signaling is configured to 'fully AndPartialAndNonCoherent' or 'partialAndNonCoherent.' In case where nrofSRS-Ports in SRS-ResourceSet which is higher signaling indicates two SRS antenna ports, the terminal may not expect that the value of codebookSubset which is higher signaling is configured to 'partialAndNonCoherent'.

The terminal may receive a configuration of one SRS resource set in which a value of usage within SRS-Resource-Set, which is higher signaling, is configured to 'codebook', and one SRS resource in the corresponding SRS resource set may be indicated through the SRI. If various SRS resources are configured within the SRS resource set in which the value of usage in SRS-ResourceSet which is higher signaling is configured to 'codebook', the terminal may expect that values of nrofSRS-Ports in SRS-Resource which is higher signaling are the same values for all SRS resources.

The terminal may transmit, to the base station, one or a plurality of SRS resources included in the SRS resource set in which the value of usage is configured to 'codebook' according to higher signaling, and the base station may select one of the SRS resources transmitted by the terminal, and may instruct the terminal to perform PUSCH transmission by using transmission beam information of the corresponding SRS resource. In this case, in the codebook-based PUSCH transmission, the SRI may be used as information for selecting an index of one SRS resource and may be included in DCI. In addition, the base station may include information indicating the TPMI and the rank to be used by the terminal for PUSCH transmission in DCI, and may transmit the DCI. The terminal may perform PUSCH transmission by using an SRS resource indicated by the SRI, and applying a precoder indicated by the TPMI and the rank which are indicated based on a transmission beam of the corresponding SRS resource.

Next, non-codebook-based PUSCH transmission will be described. The non-codebook-based PUSCH transmission may be dynamically scheduled through DCI format 0_0 or 0_1, or may semi-statically operate by a configured grant. In case where at least one SRS resource is configured within an SRS resource set in which a value of usage within SRS-ResourceSet which is higher signaling is configured to 'nonCodeBook', the terminal may receive scheduling of non-codebook-based PUSCH transmission through DCI format 0_1.

With respect to the SRS resource set in which the value of usage within SRS-ResourceSet which is higher signaling is configured to 'nonCodebook', the terminal may receive a configuration of a non-zero power (NZP) CSI-RS resource associated with one SRS resource set. The terminal may perform calculation with respect to a precoder for SRS transmission, by measuring the NZP CSI-RS resource configured in association with the SRS resource set. If a difference between a last reception symbol of an aperiodic NZP CSI-RS resource associated with the SRS resource set, and a first symbol of aperiodic SRS transmission in the terminal is less than a specific symbol (for example, 42 symbols), the terminal may not expect that information regarding the precoder for SRS transmission is refined.

When a value of resourceType in SRS-ResourceSet which is higher signaling is configured to 'aperiodic', the NZP CSI-RS associated with the SRS-ResourceSet may be indicated by an SRS request which is a field within DCI format 0_1 or 1_1. In this case, in case where the NZP CSI-RS resource associated with SRS-ResourceSet is an aperiodic NZP CSI-RS resource and a value of the field SRS request in DCI format 0_1 or 1_1 is not '00', it may be indicated that there exists NZP CSI-RS associated with SRS-ResourceSet. In this case, the corresponding DCI should not indicate cross carrier or cross BWP scheduling. In addition, in case where the value of the SRS request indicates existence of the NZP CSI-RS, the corresponding NZP CSI-RS may be positioned in a slot in which a PDCCH including the SRS request field is transmitted. In this case, TCI states configured in a scheduled subcarrier may not be configured to QCL-TypeD.

If a periodic or semi-static SRS resource set is configured, the NZP CSI-RS associated with the SRS resource set may be indicated through associatedCSI-RS in SRS-ResourceSet which is higher signaling. With respect to non-codebook-based transmission, the terminal may not expect that associatedCSI-RS in spatialRelationInfo which is higher signaling for the SRS resource and SRS-ResourceSet which is higher signaling is configured.

In case where the terminal receives a configuration of a plurality of SRS resources, the terminal may determine a precoder and a transmission rank to apply to PUSCH transmission, based on an SRI indicated by the base station. In this case, the SRI may be indicated through a field SRS resource indicator in DCI or may be configured through srs-ResourceIndicator which is higher signaling. Like in the above-described codebook-based PUSCH transmission, in case where the terminal receives an SRI through DCI, an SRS resource indicated by the corresponding SRI may refer to an SRS resource corresponding to the SRI, among SRS resources transmitted earlier than a PDCCH including the corresponding SRI. The terminal may use one or a plurality of SRS resources for SRS transmission, and the maximum number of SRS resources which may be transmitted simultaneously in the same symbol within one SRS resource set may be determined by the UE capability of the terminal to report to the base station. In this case, SRS resources that the terminal transmits simultaneously may occupy the same RB. The terminal may configure one SRS port for each SRS resource. Only one SRS resource set in which the value of usage in SRS-ResourceSet which is higher signaling is configured to 'nonCodebook' may be configured, and the number of SRS resources for non-codebook-based PUSCH transmission may be configured to four to the maximum.

The base station may transmit one NZP CSI-RS associated with the SRS resource set to the terminal, and the terminal may calculate a precoder to be used for transmission of one or a plurality of SRS resources within a corresponding SRS resource, based on a result of measuring when the corresponding NZP CSI-RS is received. The terminal may apply the calculated precoder when transmitting one or the plurality of SRS resources in the SRS resource set in which the usage is configured to 'nonCodebook' to the base station, and the base station may select one or a plurality of SRS resources from the received one or plurality of SRS resources. In this case, in the non-codebook-based PUSCH transmission, the SRI may indicate an index expressing a combination of one or a plurality of SRS resources, and the SRI may be included in DCI. In this case, the number of SRS resources indicated by the SIR transmitted by the base station may be the number of transmission layers of PUSCH, and the terminal may transmit the PUSCH by applying the precoder applied to SRS resource transmission to each layer.

Next, a PUSCH repetitive transmission will be described. When a terminal receives scheduling of PUSCH transmission in DCI format 0_1 within a PDCCH, which includes CRC scrambled into C-RNTI, MCS-C-RNTI, or CS-RNTI, if the terminal receives a configuration of higher layer signaling pusch-AggregationFactor, the same symbol allocation may be applied to as many continuous slots as pusch-AggregationFactor, and PUSCH transmission may be limited to single rank transmission. For example, the terminal should repeat the same transport block (TB) in as many continuous slots as pusch-AggregationFactor, and should apply the same symbol allocation to each slot. Table 8 shows a redundancy version applied to PUSCH repetitive transmission in each slot. If the terminal receives scheduling of PUSCH repetitive transmission in DCI format 0_1 in a plurality of slots, and at least one symbol of slots in which PUSCH repetitive transmission is performed is indicated as a downlink symbol according to information of higher layer signaling tdd-UL-DL-ConfigurationComma or tdd-UL-DL-ConfigurationDedicated, the terminal may not perform PUSCH transmission in a slot where the corresponding symbol is positioned.

TABLE 8

| $rv_{id}$ indicated by the | $rv_{id}$ to be applied to $n^{th}$ transmission occasion | | | |
|---|---|---|---|---|
| DCI scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. The 5G system supports two types of repetitive transmission of an uplink data channel, that is, a PUSCH repetitive transmission type A and a PUSCH repetitive transmission type B. The terminal may receive a configuration of one of the PUSCH repetitive transmission type A and B through higher layer signaling.

PUSCH Repetitive Transmission Type A

As described above, a start symbol and length of an uplink data channel are determined in one slot according to the time domain resource allocation method, and a base station may transmit the number of repetitive transmissions to the terminal through higher layer signaling (for example, RRC signaling) or L1 signaling (for example, DCI).

The terminal may repeatedly transmit an uplink data channel that has the same start symbol and length as the configured uplink data channel in continuous slots, based on the number of repetitive transmissions received from the base station. In this case, in case where at least one symbol of the symbols in a slot that the base station configures as a downlink for the terminal, or in a slot for repetitive transmission of an uplink data channel configured for the terminal is configured to a downlink, the terminal may omit the uplink data channel transmission in the corresponding slot. That is, the uplink data channel transmission may be included in the number of uplink data channel repetitive transmissions, but may not be performed.

PUSCH Repetitive Transmission Type B

As described above, a start symbol and length of an uplink data channel is determined in one slot according to the time domain resource allocation method, and a base station may transmit the number of repetitive transmissions numberofrepetitions to the terminal through higher signaling (for example, RRC signaling) or L1 signaling (for example, DCI).

First, based on the start symbol and length of the uplink data channel configured as described above, a nominal repetition of the uplink data channel may be determined as follows. Herein, the nominal repetition may refer to a resource of a symbol which is configured by the base station for PUSCH repetitive transmission, and the terminal may determine a resource to be used for an uplink in the configured nominal repetition. In this case, a slot in which the n-th nominal repetition starts may be given by $$K_s + \left\lfloor \frac{S + n \cdot L}{N_{symb}^{slot}} \right\rfloor,$$

and a symbol in which the nominal repetition starts in the start slot may be given by $$\mod\left(S + n \cdot L, N_{symb}^{slot}\right).$$

A slot in which the n-th nominal repetition ends may be given by $$K_s + \left\lfloor \frac{S + (n+1) \cdot L - 1}{N_{symb}^{slot}} \right\rfloor,$$

and a symbol in which the nominal repetition ends in the last slot may be given by $$\mod\left(S + (n+1) \cdot L - 1, N_{symb}^{slot}\right).$$

Herein, n=0, . . . , numberofrepetition−1, S may indicate a start symbol of a configured uplink data channel, and L may indicate a symbol length of the configured uplink data channel. $K_s$ may indicate a slot in which PUSCH transmission starts, and $$N_{symb}^{slot}$$

may indicate the number of symbols per slot.

The terminal determines an invalid symbol for the PUSCH repetitive transmission type B. A symbol configured to a downlink by tdd-UL-DL-Configuration-Common or tdd-UL-DL-ConfigurationDedicated may be determined as an invalid symbol for the PUSCH repetitive transmission type B. Additionally, the invalid symbol may be configured based on a higher layer parameter (for example, InvalidSymbolPattern). For example, the higher layer parameter (for example, InvalidSymbolPattern) may configure an invalid symbol by providing a symbol level bitmap over one slot or two slots. In this case, 1 displayed on the bitmap may indicate an invalid symbol. Additionally, a cycle and pattern of the bitmap may be configured through the higher layer parameter (for example, periodicity And-Pattern). If the higher layer parameter (for example, InvalidSymbolPattern) is configured and InvalidSymbolPatternIndicator-ForDCIFormat0_1 or InvalidSymbolPatternIndicator-ForDCIFormat0_2 parameter indicates 1, the terminal may apply the invalid symbol pattern, and, if InvalidSymbolPatternIndicator-ForDCIFormat0_1 or InvalidSymbolPatternIndicator-ForDCIFormat0_2 parameter indicates 0, the terminal may not apply the invalid symbol pattern. Alternatively, if the higher layer parameter (for example, InvalidSymbolPattern) is configured and InvalidSymbolPatternIndicator-ForDCIFormat0_1 or InvalidSymbolPatternIndicator-ForDCIFormat0_2 parameter is not configured, the terminal may apply the invalid symbol pattern.

After determining the invalid symbol in each nominal repetition, the terminal may consider symbols except for the determined invalid symbol as valid symbols. If one or more valid symbols are included in each nominal repetition, the nominal repetition may include one or more actual repetitions. Herein, each actual repetition may refer to a symbol that is actually used for PUSCH repetitive transmission among symbols configured to the configured nominal repetition, and may include a continuous set of valid symbols which are used for the PUSCH repetitive transmission type B in one slot. In case where actual repetition having one symbol is configured to be valid except for a case where a symbol length of the configured uplink data channel L is 1, the terminal may omit actual repetition transmission. A redundancy version is applied according to a redundancy version pattern which is configured for every n-th actual repetition.

Figure 6:
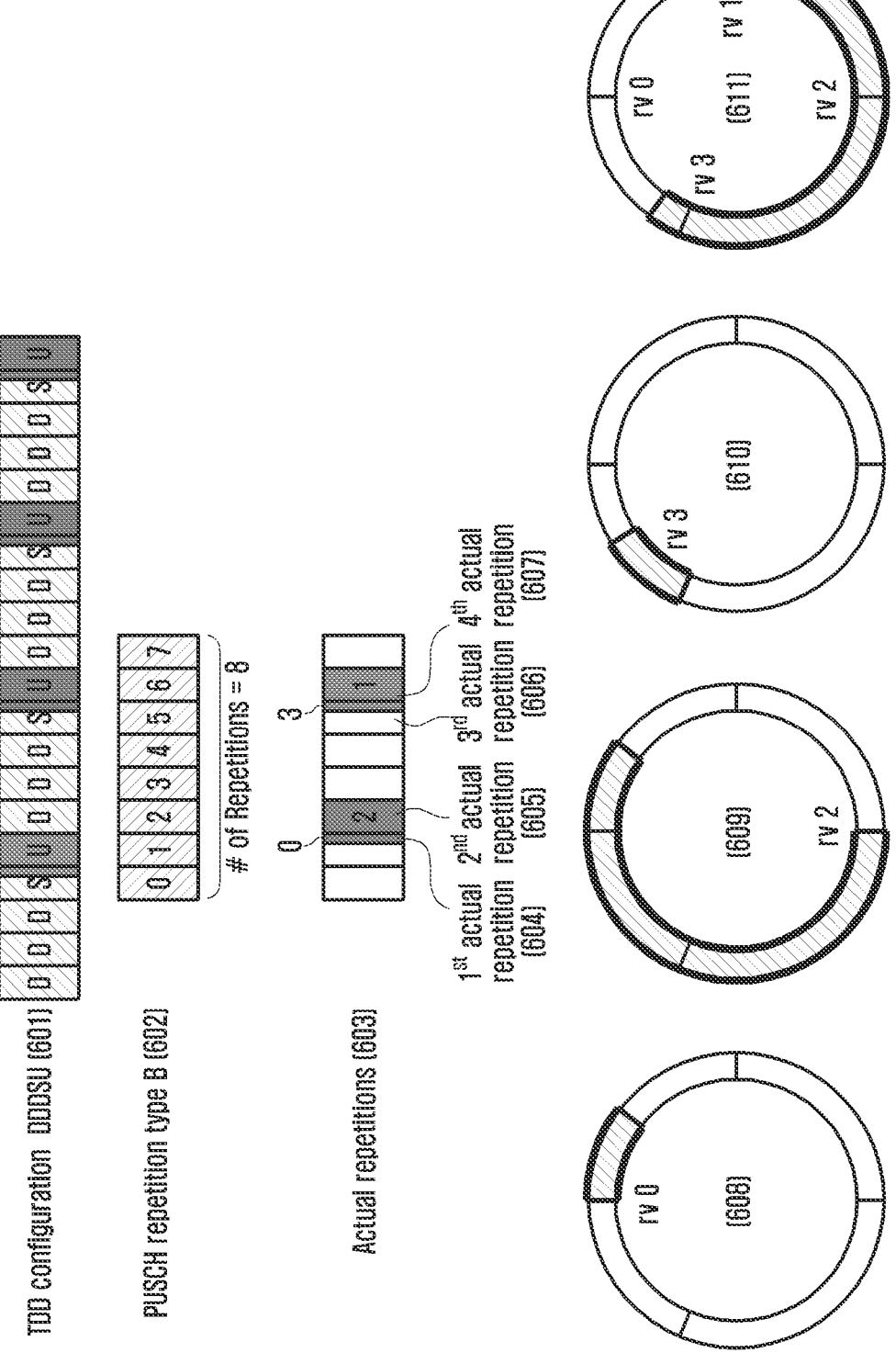
FIG. 6 is a diagram illustrating an example of a PUSCH repetitive transmission type B in a 5G system.

FIG. 6 is a diagram illustrating an example of the PUSCH repetitive transmission type B in a 5G system. A terminal may configure a frame structure of time division duplexing (TDD) to include three downlink slots, one special/flexible slot, one uplink slot. Herein, when the special/flexible slot includes 11 downlink symbols and 3 uplink symbols, an initial transmission slot in a second uplink transmission may be in the third place, and, in case where the terminal receives a configuration indicating that an index of a start symbol of an uplink data channel is 0 and a length of the uplink data channel is 14, and the number of repetitive transmissions repK is 8, a nominal repetition may appear in 8 continuous slots from the initial transmission slot (602). Thereafter, the terminal may determine a symbol that is configured to a downlink symbol in the frame structure 601 of the TDD system in each nominal repetition, as an invalid symbol, and, in case where valid symbols include one or more continuous symbols in one slot, actual repetition may be configured and transmitted (603). Accordingly, four (repK_actual=4) PUSCHs may be actually transmitted. In this case, in case where repK-RV is configured to 0-2-3-1, RV in the PUSCH of the first resource 604 actually transmitted is 0, RV in the PUSCH of the second resource 605 actually transmitted is 2, RV in the PUSCH of the third resource 606 actually transmitted is 3, and RV in the PUSCH of the fourth resource 607 actually transmitted is 1. In this case, only the PUSCH having RV of 0 and RV of 3 has a value that is decoded by itself, and in the case of the first resource 604 and the third resource 606, the PUSCH is transmitted only in three symbols which are even less than an actually configured symbol length (14 symbols), and accordingly, a length 608, 610 of bit that is rate-matched is shorter than a bit length 609, 611 calculated by a configuration.

FIG. 7 is a diagram illustrating an example of a process of segmenting a transport block (TB) into a plurality of code blocks (CBs) and adding CRC in a 5G communication system. With reference to FIG. 7, a CRC 702 may be added to a tail or head portion of one transport block (TB) 701 to be transmitted in an uplink or a downlink. The CRC 702 may have 16 bits or 24 bits, or a pre-fixed number of bits, or may have a variable number of bits according to a channel condition, and may be used to determine whether channel coding succeeds. The block in which the CRC 702 is added to the TB 701 may be segmented into a plurality of CBs 703, 704, 705, 706. In this case, a maximum size of the CB may be pre-defined, and in this case, the last CB 706 may have a size smaller than the other CBs 703, 704, 705. However, this is merely an example, and according to another example, 0, a certain value, or 1 may be inserted into the last CB 706, such that the last CB 706 and the other CBs 703, 704, 705 have the same length. In addition, CRCs 711, 712, 713, 714 may be added to CBs 707, 708, 709, 710, respectively. The CRCs 711, 712, 713, 714 may have 16 bits or 24 bits or a pre-fixed number of bits, and may be used to determine whether channel coding succeeds. In order to generate the CRC 702, the TB 701 and a cyclic generator polynomial may be used. The cyclic generator polynomial may be defined in various methods. For example, on the assumption that a cyclic generator polynomial for a 24-bit CRC is gCRC24A(D)=D24+D23+D18+D18+D14+D11+D10+D7+D6+D5+D4+D3+D+1, if L=24, CRC p1, p2, . . . , pL−1 regarding TB data a0, a1, a2, a3, . . . , aA−1 may be determined to be a value that has the remainder of 0 when 0DA+23+a1DA+22+aA−1D24+p0D23+p1D22+ . . . +p22D1+p23 is divided by gCRC24A(D), that is, p1, p2, . . . , pL−1. In the above-described example, it is illustrated that the CRC length L is 24, but the CRC length L may be determined to be various lengths like 12, 16, 24, 32, 40, 48, 64, etc. After the CRC is added to the TB through this process, the TB+CRC may be segmented into N number of CBs 703, 704, 705, 706. CRCs 711, 712, 713, 714 may be added to the segmented CBs 703, 704, 705, 706, respectively. The CRC added to the CB may have a different length from that when the CRC added to the TB is generated, or may be generated based on other cyclic generator polynomials for CRC generation. In addition, the CRC 702 added to the TB and the CRCs 711, 712, 713, 714 added to the CBs may be omitted according to a type of a CB applied to the CB. For example, in case where a LDPC code other than a turbo code is applied to the CB, the CRCs 711, 712, 713, 714 to be inserted to every CB may be omitted. However, even in case where the LDPC is applied, the CRCs 711, 712, 713, 714 may be added to the CBs as they are. In addition, even in case where a polar code is used, the CRC may be added or may be omitted. As described in FIG. 7, a maximum length of one CB of the TB to be transmitted may be determined according to a type of channel coding applied, and the TB and the CRC added to the TB may be segmented into CBs according to the maximum length of the CB. In a conventional LTE system, a CRC for a CB may be added to the segmented CB, and the data bits and CRC of the CB may be encoded into a channel code, and accordingly, coded bits are determined, and for each coded bit, the number of bits to be rate-matched (RM) may be determined as promised.

Hereinafter, a method for calculating a transport block size (TBS) in a 5G system will be described in detail.

The number of REs allocated to PUSCH mapping in one PRB within an allocated resource, $$N'_{RE},$$

is calculated $$N'_{RE}$$

may be calculated by $$N^{RB}_{sc} \times N^{sh}_{symb} - N^{PRB}_{DMRS} - N^{PRB}_{oh}.$$

Herein, $$N^{RB}_{sc}$$

may be 12 and $$N^{sh}_{symb}$$

may indicate the number of OFDM symbols allocated to a PUSCH.

$$N^{PRB}_{DMRS}$$

is the number of REs in one PRB occupied by a DMRS of the same CDM group.

$$N^{PRB}_{sh}$$

is the number of REs occupied by an overhead in one PRB configured by higher signaling, and may be configured to one of 0, 6, 12, 18. Thereafter, the number of REs allocated to the PUSCH, $N_{RE}$, may be calculated. $N_{RE}$ may be calculated by $$\min(166, N'_{RE}) \times n_{PRS},$$

$n_{PRB}$ indicates the number of PRBs allocated to a terminal. The number of temporary information, $N_{info}$, may be calculated by $N_{RE} \times R \times Q_m \times v$. Herein, R is a code rate and $Q_m$ is a modulation order, and information of these values may be transmitted by using an MCS bit field of DCI and a pre-defined table. In addition, v is the number of allocated layers. If $N_{info} \leq 3824$, a TBS may be calculated through the following process. Otherwise, the TBS may be calculated through step 4.

$$N'_{info}$$

may be calculated through equations of $$N_{info} = \max\left(24, 2^n \times \left\lfloor \frac{N_{info}}{2^n} \right\rfloor\right) \text{ and } n = \max(3, \lfloor \log_2(N_{info}) \rfloor - 6).$$

The TBS may be determined by a value that is closest to $N_{info}$ among values that are not smaller than $N_{info}'$ in Table 9 below.

TABLE 9

| Index | TBS |
|-------|-----|
| 1 | 24 |
| 2 | 32 |
| 3 | 40 |
| 4 | 48 |
| 5 | 56 |
| 6 | 64 |

TABLE 9-continued

| Index | TBS |
|---|---|
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |

TABLE 9-continued

| Index | TBS |
|---|---|
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info} > 3824$, $$N'_{info}$$

may be calculated through equations of $$N'_{info} = \max\left(3840,\ 2^n \times \text{round}\left(\frac{N_{info} - 24}{2^n}\right)\right) \quad \text{and} \quad n = \lfloor \log_2(N_{info} - 24) \rfloor - 5.$$

TBS may be determined through $$N'_{info}$$

and [pseudo-code 1] below. C shown below corresponds to the number of CBs included in one TB.

```
[Pseudo-code 1 start]
if R ≤ 1/4
```
$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$
```
else
if N_info' > 8424
```
$$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$
```
else
```
$$TBS = 8 \cdot \left\lceil \frac{N'_{info} + 24}{8} \right\rceil - 24$$
```
end if
end if
    Pseudo-code 1 end
```

Hereinafter, a PUSCH transmission/repetitive transmission control method according to a configuration of a cancellation indication (CI), a slot-format indication (SFI) and PUSCH/PUCCH overlapping in a 5G system will be described in detail.

FIG. 8 is a diagram illustrating a method for determining the validity of HARQ-ACK information for PUSCH transmission in a 5G system. For PUSCH transmission configured by ConfiguredGrantConfig, if the terminal receives the first symbol of a PDCCH after the last symbol of PUSCH transmission (or of each and every PUSCH repetitive transmission) and the received first symbol of the PDCCH is positioned after the number of symbols configured by cg-minDFI-Delay, the terminal determines that HARQ-ACK information corresponding to related HARQ process number is valid. In FIG. 8, for PUSCH repetitive transmission configured by ConfiguredGrantConfig, If, for each PUSCH repetitive transmission, the reception position of the first symbol of the PDCCH is positioned after the last symbol of the PUSCH repetitive transmission and received after the number of symbols configured by cg-minDFI-Delay 802 (803), the terminal may determine that the HARQ information corresponding to the HARQ process number may be valid (801).

For PUSCH transmission configured through L1 signaling (DCI format), if the terminal receives the first symbol of the PDCCH after the last symbol of the PUSCH transmission and the received first symbol of the PDCCH is located after the number of a symbol configured by cg-minDFI-Delays, the terminal determines that the HARQ-ACK information corresponding to the related HARQ process number is valid. In addition, for PUSCH transmission configured through L1 signaling (DCI format), if PUSCH is repetitively transmitted for multiple slots and HARQ-ACK information is ACK, and if the terminal receives the first symbol of the PDCCH after the last symbol of the PUSCH transmission in the first slot of PUSCH repetitive transmission over multiple slots, and the received first symbol of the PDCCH is positioned after the number of symbols configured by cg-minDFI-Delay, the terminal determines that the HARQ-ACK information corresponding to the related HARQ process number is valid. On the other hand, if the PUSCH is repetitively transmitted for multiple slots and the HARQ-ACK information is NACK, and if the terminal receives the first symbol of the PDCCH after the last symbol of the PUSCH transmission of the last slot of the PUSCH repetitive transmission over multiple slots, and the received first symbol of the PDCCH is positioned after the number of symbols configured by cg-minDFI-Delay, the terminal determines that HARQ-ACK information corresponding to the related HARQ process number is valid. In FIG. 8, for PUSCH repetitive transmission configured through L1 signaling (DCI format), if the PUSCH is repetitively transmitted for multiple slots and the HARQ-ACK information is ACK, and if the first symbol of the PDCCH after Repe #0 is positioned after the number of symbols configured by cg-minDFI-Delay, the terminal determines that the HARQ-ACK information having HARQ process number is valid (805). If the PUSCH is repetitively transmitted for multiple slots and the HARQ-ACK information is NACK, and if the first symbol of the PDCCH after Repe #3 is positioned after the number of symbols configured by cg-minDFI-Delay, the terminal determines that the HARQ-ACK information having HARQ process number is valid (806).

FIG. 9 is a diagram illustrating TB processing over multi-slot (TBoMS) PUSCH transmission in a 5G system. The terminal or base station may allocate one TB 901 to multiple slots 902, 903, 904, 905 and transmit the same. In this case, instead of allocating multiple small TBs to resources of multiple slots 902, 903, 904, 905, one TB may be allocated, so that a ratio of CRC is reduced and a low code rate is obtained, and a channel coding gain is obtained and a coverage of a channel is enhanced. In addition, with reference to FIG. 9, as a time domain resource allocation method of TBoMS PUSCH transmission, a method 906 of allocating time domain resources like the PUSCH repetitive transmission type A may be applied. In case where resources are allocated to the PUSCH for TBoMS like the PUSCH repetitive transmission type A, the PUSCH may be transmitted in multiple slots each of which has the same symbol resource.

FIG. 10 is a diagram illustrating transmission occasion for TBoMS (TOT) of TB processing over multi-slot (TBoMS) PUSCH transmission in a 5G system. When the terminal is configured with TBoMS through higher layer signaling and L1 signaling, the TOT concept may be applied to perform rate matching, power control, collision rule, beam mapping, etc. for PUSCH transmission transmitted in multiple slots of TBoMS. In this case, the same TOT may be allocated to consecutive physical slots, and the TOT number may be incremented and allocated for non-consecutive physical slots. In addition, the terminal may apply TOT by being assigned a specific number of slots through higher layer signaling and L1 signaling. For example, the above method may be considered in case where TBoMS and joint channel estimation are configured together. With reference to FIG. 10, if the terminal receives TBoMS configuration for four consecutive slots through higher layer signaling and L1 signaling (1001), the same TOT may be configured for all consecutive slots (1002). In another method, in case where the terminal is configured to a random variable x=2 slots through additional signaling, the terminal may be configured to [(slot0, slot1)=TOT #0, (slot2, slot3)=TOT #1] for four consecutive slots (1003). When the terminal is configured with TBoMS for four non-consecutive slots (slot0, slot N, slot N+1, slot M) through higher layer signaling and L1 signaling (1002), slot0 may be configured to TOT #0, continuous (slot N, slot N+1) may be configured to TOT #1, and slot M may be configured to TOT #2 (1005).

In the disclosure, a method for configuring conditions for determining the validation of HARQ-ACK information of PUSCH transmission in which one TB is allocated to multiple slots (TBoMS) and multiple-PUSCH transmission that estimates joint channels in a 5G communication system is described. In addition, the disclosure propose a new cg-minDFI-Delay for TBoMS and joint channel estimation. The HARQ-ACK information determination method according to an embodiment of the disclosure may be applied to TBoMS in which PUSCH is transmitted in multiple slots and PUSCH transmission for joint channel estimation to which an existing HARQ-ACK information determination method used in PUSCH transmission/repetitive transmission transmitted in one slot cannot be applied. Through the method of the disclosure, HARQ-ACK information is applied to TBoMS in which PUSCH is transmitted in multiple slots and PUSCH transmission for joint channel estimation, so that flexible resource management is possible through early termination and unnecessary PDCCH transmission can be managed.

According to an embodiment of the disclosure, an operating method of a terminal for determining valid HARQ-ACK information for a physical uplink shared channel (PUSCH) transmitting one TB in multiple slots and multiple-PUSCH transmission in which joint estimation is performed, based on the PUSCH in which one TB is transmitted in multiple slots (TBoMS) and multiple-PUSCH transmission in which joint estimation is performed, may comprise receiving, from a base station, configuration information for a PUSCH for transmitting one TB in multiple slots and multiple PUSCHs that are jointly estimated; receiving a PDCCH with a corresponding HARQ process number and cg-minDFI-Delay information from the base station; determining validation of HARQ-ACK information using a first symbol of the PDCCH with the same HARQ process number and the slot and symbol position of the multiple-PUSCH transmissions, based on the configured TBoMS configuration information, the configuration information of the multiple-PUSCH transmission in which joint estimation is performed, and cg-minDFI-Delay information, from the base station; and performing early termination of the PUSCH with the same HARQ process number based on the configured HARQ-ACK information of the PDCCH and retransmitting the PUSCH with the same HARQ process number to the base station.

According to an embodiment of the disclosure, an operating method of a base station for determining valid HARQ-ACK information for a physical uplink shared channel (PUSCH) transmitting one TB in multiple slots and multiple-PUSCH transmission in which joint estimation is performed, based on the PUSCH in which one TB is transmitted in multiple slots (TBoMS) and multiple-PUSCH transmission in which joint estimation is performed, may comprise transmitting, to a terminal, configuration information for a PUSCH for transmitting one TB in multiple slots and multiple PUSCHs that are jointly estimated; transmitting a PDCCH with a corresponding HARQ process number and cg-minDFI-Delay information to the terminal; determining validation of HARQ-ACK information using a first symbol of the PDCCH with the same HARQ process number and the slot and symbol position of the multiple-PUSCH transmissions, based on the configured TBoMS configuration information, the configuration information of the multiple-PUSCH transmission in which joint estimation is performed, and cg-minDFI-Delay information, to the terminal, and transmitting the PDCCH including the same HARQ process number; and configuring, to the terminal, early termination of the PUSCH with the same HARQ process number based on the PDCCH with the configured same HARQ process number and receiving retransmission of the PUSCH with the same HARQ process number.

According to the disclosure, a method for determining validity of HARQ-ACK information for PUSCH transmission in which one TB is allocated to multiple slots and multiple-PUSCH transmission in which joint channel estimation is performed will be described through an embodiment.

The embodiment provides a method for determining validity of HARQ-ACK information for PUSCH transmission in which one TB is allocated to multiple slots and multiple-PUSCH transmission in which joint channel estimation in a 5G system. In this case, the embodiment of the disclosure is described as continuous TBoMS PUSCH transmission for resources available for PUSCH transmission based on the same PRB number and start symbol between TBoMS repetitive transmissions, but this is for illustrative purposes only and does not limit the scope of the disclosure. In addition, repetitive transmission of TBoMS may be configured and transmitted based on the number of different PRBs between repetitive transmissions, a start symbol, and a symbol length. In addition, the embodiment of the disclosure describes a PUSCH transmission method based on joint channel estimation of PUSCH repetitive transmission of multiple PUSCH repetitive transmission types A/B, but this is for illustrative purposes only and does not limit the scope of the disclosure. In addition, joint channel estimation may be performed in continuous or discontinuous PUSCH transmission by which homeostasis of transmission power of the PUSCH and continuity of a phase are maintained, and the method of the disclosure may be applied to such joint channel estimation situation.

The method for determining validity of HARQ-ACK information of PUSCH transmission according to the embodiment of the disclosure provides early termination and multi-slot PUSCH retransmission control method for PUSCH transmission transmitted through multiple slots, and can improve uplink coverage through flexible use of time domain resources.

Hereinafter, in describing the overall embodiment of the disclosure, PUSCH transmission of TBoMS and joint channel estimation of PUSCH repetitive transmission have been described by way of an example, but this is merely an example, and does not limit the scope of the disclosure. In addition, the embodiments of the disclosure may be applied to transmission of PUSCH/PUCCH/PDSCH/PDCCH/physical sidelink shared channel (PSSCH)/physical sidelink control channel (PSCCH) pre-defined/configured or configured through signaling between a base station and a terminal. In addition, according to the embodiment of the disclosure, a configuration method for TBoMS and joint channel estimation may be pre-defined/or configured or may be configured through signaling between a base station and a terminal. In this case, a certain value included in the configured information may be configured by one of a symbol/slot length, continuity of PUSCH transmission and an interval between PUSCH transmissions, the number of PUSCH transmissions, and a transmission occasion, or a combination of these.

First Embodiment

The first embodiment of the disclosure provides a method for determining validity of HARQ-ACK information when performing joint channel estimation for multiple-PUSCH transmission. In the disclosure, the PUSCH will be mainly described, but this method may be applied to PDSCH/PSSCH transmission.

[Method 1]

In method 1, a method for determining validity of HARQ-ACK information when performing joint channel estimation for PUSCH repetitive transmission consisting of one TB will be described.

FIG. 11 is a diagram for explaining the operation of a terminal that determines validity of HARQ-ACK information for PUSCH repetitive transmission that performs joint channel estimation in a 5G system. When performing joint channel estimation for PUSCH repetitive transmission consisting of one TB, if a PDCCH with the same HARQ process number is received, a terminal may determine the validity of application of HARQ-ACK information based on the position of the first transmitted symbol of the PDCCH.

With reference to FIG. 11, in case where the terminal is configured to receive multiple-PUSCH repetitive transmissions that perform joint channel estimation through higher layer signaling or L1 signaling from the base station and receives a PDCCH with the same HARQ process number, a method for determining validity of HARQ-ACK information of PDCCH through the position of the first symbol of the received PDCCH is illustrated. When the terminal is configured to PUSCH repetitive transmission type A and repetitive transmission number repeK='4' and is configured to joint channel estimation through higher layer signaling or L1 signaling from the base station, the terminal may maintain and transmit transmission power and phase to perform joint channel estimation on Repe #0 to Repe #3 based on the configured information. In this case, the channels of all repetitive transmissions Repe #0 to Repe #3 are jointly estimated, and decoding may be performed after receiving the last repetitive transmission Repe #3 (1101). That is, the terminal may be configured to multiple-PUSCH repetitive transmission that perform joint channel estimation by the base station through higher layer signaling or L1 signaling, and may receive a PDCCH with a related HARQ process number from the base station. Then, if the first symbol of the PDCCH is positioned after cg-minDFI-Delay-r17 1102 in the last symbol of the last Repe #3 that performs joint channel estimation where decoding is performed, the terminal may determine that HARQ-ACK information is valid (1103). The cg-minDFI-Delay-r17 may be newly defined as the minimum duration for HARQ-ACK processing based on the number of slots of multiple-PUSCH transmission in which joint channel is estimated.

In addition, when the terminal is configured to PUSCH repetitive transmission type B and repetitive transmission number repeK='4' and is configured to joint channel estimation through higher layer signaling or L1 signaling from the base station, the terminal may maintain and transmit transmission power and phase to perform joint channel estimation on Repe #0 to Repe #3 based on the configured information. In this case, the channels of all repetitive transmissions Repe #0 to Repe #3 are jointly estimated, and decoding may be performed after receiving the last repetitive transmission Repe #3 (1104). That is, the terminal may be configured to multiple-PUSCH repetitive transmission that perform joint channel estimation by the base station through higher layer signaling or L1 signaling, and may receive a PDCCH with a related HARQ process number from the base station. Then, if the first symbol of the PDCCH is positioned after cg-minDFI-Delay-r17 1105 in the last symbol of the last Repe #3 that performs joint channel estimation where decoding is performed, the HARQ-ACK information may be determined to be valid. (1106). The cg-minDFI-Delay-r17 may be newly defined as the minimum duration for HARQ-ACK processing based on the total symbol length of multiple-PUSCH transmission in which joint channel is estimated.

[Method 2]

In method 2, a method for determining validity of HARQ-ACK information when performing joint channel estimation for PUSCH repetitive transmission consisting of several different TBs will be described.

FIG. 12 is a diagram for explaining the operation of a terminal that determines validity of HARQ-ACK information for PUSCH repetitive transmission consisting of several different TBs that performs joint channel estimation in a 5G system. When performing joint channel estimation for PUSCH repetitive transmission consisting of several different TBs, if a PDCCH with the HARQ process number corresponding to the PUSCH consisting of respective different TBs is received, a terminal may determine the validity of application of HARQ-ACK information based on the position of the first transmitted symbol of the PDCCH.

With reference to FIG. 12, in case where the terminal is configured to multiple-PUSCH repetitive transmission consisting of several different TBs that perform joint channel estimation through higher layer signaling or L1 signaling from the base station and receives a PDCCH with HARQ process number corresponding to PUSCH of respective different TBs, a method for determining validity of HARQ-ACK information of PDCCH through the position of the first symbol of the received PDCCH is illustrated. When the terminal is configured to PUSCH repetitive transmission type A consisting of different TBs [(Initial #0, Repe #0), (Initial #1,Repe #1)] and joint channel estimation through higher layer signaling or L1 signaling from the base station, the terminal may maintain and transmit transmission power and phase to perform joint channel on Initial #0, Repe #0, Initial #1,Repe #1 based on the configured information. In this case, the channels of all PUSCH transmissions [(Initial #0, Repe #0), (Initial #1, Repe #1)] are jointly estimated, and decoding may be performed after receiving the last repetitive transmission Repe #1 (1201). That is, the terminal may be configured to multiple-PUSCH repetitive transmission consisting of different TBs that perform joint channel estimation by the base station through higher layer signaling or L1 signaling, and may receive a PDCCH with a related HARQ process number from the base station. Then, if the first symbol of the PDCCH is positioned after cg-minDFI-Delay-r17 1202 in the last symbol of the last Repe #1 that performs joint channel estimation where decoding is performed, the terminal may determine that the HARQ-ACK information is valid (1203). In this case, the configured PDCCH may have all or only one HARQ-ACK information corresponding to the PUSCH consisting of two different TBs. The cg-minDFI-Delay-r17 may be newly defined as the minimum duration for HARQ-ACK processing based on the number of slots of multiple-PUSCH transmission consisting of different TBs in which joint channel is estimated.

In addition, when the terminal is configured to PUSCH repetitive transmission type B consisting of different TBs [(Initial #0, Repe #0), (Initial #1,Repe #1)] and joint channel estimation through higher layer signaling or L1 signaling from the base station, the terminal may maintain and transmit transmission power and phase to perform joint channel on Initial #0, Repe #0, Initial #1,Repe #1 based on the configured information. In this case, the channels of all PUSCH transmissions [(Initial #0, Repe #0), (Initial #1, Repe #1)] are jointly estimated, and decoding may be performed after receiving the last repetitive transmission Repe #1 (1204). That is, the terminal may be configured to multiple-PUSCH repetitive transmission consisting of different TBs that perform joint channel estimation by the base station through higher layer signaling or L1 signaling, and may receive a PDCCH with a related HARQ process number from the base station. Then, if the first symbol of the PDCCH is positioned after cg-minDFI-Delay-r17 1205 in the last symbol of the last Repe #1 that performs joint channel estimation where decoding is performed, the terminal may determine that HARQ-ACK information is valid. (1206). In this case, the configured PDCCH may have all or only one HARQ-ACK information corresponding to the PUSCH consisting of two different TBs. The cg-minDFI-Delay-r17 may be newly defined as the minimum duration for HARQ-ACK processing based on the symbol length of multiple-PUSCH transmission consisting of different TBs in which joint channel is estimated.

[Method 3]

In method 3, a method for determining validity of HARQ-ACK information when performing joint channel estimation for PUSCH repetitive transmission will be described.

FIG. 13 is a diagram for explaining the operation of a terminal that configures cg-minDFI-Delay to determine validity of HARQ-ACK information for PUSCH repetitive transmission consisting of several different TBs that performs joint channel estimation in a 5G system. When performing joint channel estimation for PUSCH repetitive transmission, if a PDCCH with the HARQ process number corresponding to the PUSCH, a terminal may determine the validity of application of HARQ-ACK information based on the position of the first transmitted symbol of the PDCCH.

With reference to FIG. 13, in case where the terminal is configured to multiple-PUSCH repetitive transmission that perform joint channel estimation through higher layer signaling or L1 signaling from the base station and receives a PDCCH with HARQ process number corresponding to PUSCH of respective different TBs, a method for determining validity of HARQ-ACK information of PDCCH through the position of the first symbol of the received PDCCH is illustrated. When the terminal is configured to PUSCH repetitive transmission type A consisting of different TBs (Repe #0 to Repe #3) and time domain window=4 slot for joint channel estimation through higher layer signaling or L1 signaling from the base station, the terminal may maintain and transmit transmission power and phase to perform joint channel estimation on Repe #0 to Repe #3 based on the configured information. In this case, the channels of all PUSCH transmissions (Repe #0 to Repe #3) are jointly estimated, and decoding may be performed after receiving the last repetitive transmission Repe #3 (1301). In this case, the terminal may be configured to cg-minDFI-Delay-r17 (1302) scaled by 4 slots based on the above configured time domain window=4 slots for joint channel estimation. Then, if the first symbol of the received PDCCH is positioned after cg-minDFI-Delay-r17 1302 in the last symbol of the first Repe #0 of PUSCH repetitive transmission, the terminal may determine that the HARQ-ACK information is valid (1303). In this case, the configured PDCCH may have all or only one HARQ-ACK information corresponding to the PUSCH consisting of two different TBs. The above cg-minDFI-Delay-r17 may be newly defined as the minimum duration for HARQ-ACK processing based on the number of slots of multiple-PUSCH transmission consisting of different TBs in which joint channel is estimated.

Hereinafter, in describing the overall embodiment of the disclosure, the joint channel estimation of PUSCH repetitive transmission consisting of one TB has been described by way of an example, but this is merely an example, and does not limit the scope of the disclosure. In addition, the embodiments of the disclosure may be applied to PUSCH repetitive transmission type B and different PUSCH transmissions. In addition, cg-minDFI-Delay-r17 for multiple PUSCHs performing joint channel estimation may be scaled by the total number of slots performing joint channel estimation, the number of repetitive transmissions, the length of the symbol, any configured duration value (e.g. time domain window), or the like.

Based on the methods (Methods 1 to 3) of the above embodiment, the terminal may determine the validity of HARQ-ACK information of multiple-PUSCH transmission that performs joint channel estimation through higher layer signaling and L1 signaling. In addition, through the above methods, more flexible resource management may be supported by configuring early termination and retransmission for multiple-PUSCH transmission that perform joint channel estimation.

Second Embodiment

The second embodiment of the disclosure provides various methods for determining the validity (effectiveness) of HARQ-ACK information for one TB in case where the TB is transmitted through a plurality of slots. Transmission of one TB through a plurality of slots may include, for example, TBoMS PUSCH transmission as described with respect to FIG. 9 or FIG. 10. In the disclosure, the description is focused on PUSCH, but this method/concept may also be applied to other channels, such as PDSCH/PSSCH transmission.

According to an embodiment of the disclosure, in case where one TB is transmitted through a plurality of slots by TBoMS transmission configuration, if a distance between 'the last symbol used for transmission of the TB in the last slot' among the slots to which the TB is mapped and 'the first symbol of the resource on which the PDCCH including DCI including HARQ-ACK information for the TB is transmitted' is greater than or equal to (or exceeds) a certain length, the HARQ-ACK information may be determined to be valid.

According to an embodiment of the disclosure, in case where one TB is transmitted through a plurality of slots by TBoMS transmission configuration, if a distance between 'the last symbol used for transmission of one RV transmission corresponding to the TB in the last slot' among the slots to which the one RV is mapped and 'the first symbol of the resource on which the PDCCH including DCI including HARQ-ACK information for the TB is transmitted' is greater than or equal to (or exceeds) a certain length, the HARQ-ACK information may be determined to be valid.

According to an embodiment of the disclosure, in case where one TB is transmitted through a plurality of slots by TBoMS transmission configuration and the plurality of slots correspond to a plurality of TOTs, the TOT corresponding to the point in time for determining the validity of HARQ-ACK information may be determined according to a RV mapping method of TOT. The TOT is determined and according to whether a distance between 'the last symbol used for transmission of the TB in the last slot among at least one slot(s) included in the determined TOT' and 'the first symbol of the resource on which the PDCCH including DCI including HARQ-ACK information for the TB is transmitted' is greater than or equal to (or exceeds) a certain length, the validity of the HARQ-ACK information may be determined (valid in case where the distance is greater than equal to (exceeds) a certain length). In case where one RV is continuously mapped to multiple TOTs, the 'TOT for determining the validity of HARQ-ACK information' may be determined as the last TOT among the TOTs selected for the mapping, and in case where the RV is mapped for each TOT, the 'TOT for determining the validity of HARQ-ACK information' may be determined as some of the TOTs to which the one RV is mapped (the first TOT or/and the last TOT).

According to an embodiment of the disclosure, in case where the RVs are mapped for each TOT, the HARQ-ACK information may additionally affect the determination of the validity of HARQ-ACK information. In case where the HARQ-ACK information is ACK, the TOT corresponding to the time for determining the validity of the HARQ-ACK information may be determined with the first TOT. In case where the HARQ-ACK information is NACK, the TOT corresponding to the time for determining the validity of the HARQ-ACK information may be determined with the last TOT.

FIG. 14 is a diagram for explaining the operation of determining the validity of HARQ-ACK information for TBoMS transmission in a 5G system according to an embodiment of the disclosure. The description of the configuration for TBoMS transmission is omitted as it overlaps with the description of FIG. 9 or FIG. 10. The terminal may determine the validity (effectiveness) of HARQ-ACK information for TBoMS transmission based on the position of the first symbol of the PDCCH on which DCI including the HARQ-ACK information is transmitted.

With reference to FIG. 14, in case where the terminal is configured/indicated to TBoMS transmission by the base station through higher layer signaling and/or L1 signaling and transmits TBoMS, and then receives a PDCCH in which the DCI including HARQ-ACK information for the transmission is transmitted, a method for determining the validity (effectiveness) of the HARQ-ACK information according to the position of the first symbol of the received PDCCH is illustrated.

The terminal may be configured/indicated to TBoMS transmission (S=6, L=9, k=4 and allocated to continuous slots) by the base station through higher layer signaling and/or L1 signaling, as shown in 1401. The configured/indicated resource may include at least one TOT, and a method for mapping the RV to the TOT may be configured/indicated or promised. For example, one RV may be continuously mapped to at least one TOT and transmitted, or an RV may be mapped and transmitted for each TOT.

The terminal sequentially maps and transmits one RV corresponding to one TB to TOT #0 included in the TBoMS transmission resource according to the configuration/indication (1401-1), and may receive a PDCCH in which the DCI including HARQ-ACK information for this is transmitted. If the first symbol of the PDCCH is positioned after cg-minDFI-Delay-r17 (1402) in the last symbol transmitted by continuously mapping one RV corresponding to one TB of the terminal, the HARQ-ACK information may be determined to be valid (1403). The cg-minDFI-Delay-r17 may be newly defined as a minimum duration for HARQ-ACK processing based on the TBoMS transmission method (resource allocation (continuous, discontinuous, S/L/k value), RV mapping method, etc.). Alternatively, the existing cg-minDFI-Delay value may be recycled.

The terminal maps and transmits one RV corresponding to one TB to each of TOT #0 and TOT #1 included in the TBoMS transmission resources, respectively, according to the configuration/indication (1401-2), and may receive a PDCCH in which the DCI including HARQ-ACK information for this is transmitted. If the first symbol of the PDCCH is positioned after cg-minDFI-Delay-r17 (1404) in the last symbol transmitted by mapping one RV corresponding to one TB of the terminal, the HARQ-ACK information may be determined to be valid (1405). The cg-minDFI-Delay-r17 may be newly defined as a minimum duration for HARQ-ACK processing based on the TBoMS transmission method (resource allocation (continuous, discontinuous, S/L/k value), RV mapping method, etc.). Alternatively, the existing cg-minDFI-Delay value may be recycled.

The terminal may be configured/indicated to TBoMS transmission (S=6, L=9, k=4 and allocated to discontinuous slots) by the base station through higher layer signaling and/or L1 signaling, as shown in 1411. The configured/indicated resource may include at least one TOT, and a method for mapping the RV to the TOT may be configured/indicated or promised. For example, one RV may be continuously mapped to at least one TOT and transmitted, or an RV may be mapped and transmitted for each TOT.

The terminal maps and transmits one RV corresponding to one TB to each of TOT #0, TOT #1, TOT #2 included in the TBoMS transmission resource, respectively, according to the configuration/indication (1411-1), and may receive a PDCCH in which the DCI including HARQ-ACK information for this is transmitted. If the first symbol of the PDCCH is positioned after cg-minDFI-Delay-r17 (1412) in the last symbol transmitted by mapping one RV corresponding to one TB of the terminal, the HARQ-ACK information may be determined to be valid (1413). The cg-minDFI-Delay-r17 may be newly defined as a minimum duration for HARQ-ACK processing based on the TBoMS transmission method (resource allocation (continuous, discontinuous, S/L/k value), RV mapping method, etc.). Alternatively, the existing cg-minDFI-Delay value may be recycled.

The terminal continuously maps and transmits one RV corresponding to one TB to TOT #0, TOT #1, TOT #2 included in the TBoMS transmission resource according to the configuration/indication (1411-2), and may receive a PDCCH in which the DCI including HARQ-ACK information for this is transmitted. If the first symbol of the PDCCH is positioned after cg-minDFI-Delay-r17 (1414) in the last symbol transmitted by continuously mapping one RV corresponding to one TB of the terminal, the HARQ-ACK information may be determined to be valid (1415). The cg-minDFI-Delay-r17 may be newly defined as a minimum duration for HARQ-ACK processing based on the TBoMS transmission method (resource allocation (continuous, discontinuous, S/L/k value), RV mapping method, etc.). Alternatively, the existing cg-minDFI-Delay value may be recycled.

The terminal maps and transmits one RV corresponding to one TB to each of TOT #0, TOT #1, TOT #2 included in the TBoMS transmission resource, respectively, according to the configuration/indication (1411-1), and may receive a PDCCH in which the DCI including HARQ-ACK information for this is transmitted. If HARQ-ACK information for the TB transmission is ACK, and the first symbol of the PDCCH is positioned after cg-minDFI-Delay-r17 (1412) in the last symbol of the first TOT transmitted by mapping one RV corresponding to one TB of the terminal, the HARQ-ACK information may be determined to be valid (1413). If HARQ-ACK information for the TB transmission is NACK, and the first symbol of the PDCCH is positioned after cg-minDFI-Delay-r17 in the last symbol of the last TOT transmitted by mapping one RV corresponding to one TB of the terminal, the HARQ-ACK information may be determined to be valid (not illustrated). The cg-minDFI-Delay-r17 may be newly defined as a minimum duration for HARQ-ACK processing based on the TBoMS transmission method (resource allocation (continuous, discontinuous, S/L/k value), RV mapping method, etc.). Alternatively, the existing cg-minDFI-Delay value may be recycled.

Third Embodiment

FIG. 15A is a flowchart for explaining the operation of a terminal that determines the validity of HARQ-ACK feedback information for multi-slot PUSCH transmission (TBoMS) consisting of one TB and/or PUSCH transmission in which joint channel estimation is performed, according to an embodiment of the disclosure.

The terminal may receive TB processing over multi-slot (TBoMS), including information on a position of a start symbol, length of symbol, number of multiple slots, time domain resource allocation type, and bundling size for joint channel estimation, and/or joint channel estimation configuration/scheduling information through higher layer signaling or L1 signaling (1501). The terminal may perform PUSCH transmission based on the configuration/scheduling information received in operation 1501 (1502). The terminal may receive a PDCCH transmitting DCI including HARQ-ACK feedback information for the PUSCH transmission (1503). The terminal may determine the validity of the HARQ-ACK feedback information included in the DCI transmitted through the received PDCCH according to one of the conditions described above in the disclosure or a combination of the conditions described above in the disclosure (1504). For example, whether a distance between the position of the first symbol in which the received PDCCH is transmitted and the last symbol of the PUSCH transmission is greater than or equal to a certain period of time may be the above condition. If the condition in operation 1504 is satisfied, the terminal may determine that the above received HARQ-ACK feedback information is valid (1505). Otherwise, the terminal may determine that the above received HARQ-ACK feedback information is invalid (1506). For example, in case where the above received HARQ-ACK feedback information is valid, the terminal can flush a HARQ buffer corresponding to the HARQ-ACK information. Otherwise, the terminal may discard the HARQ-ACK information without flushing the HARQ buffer corresponding to the HARQ-ACK information.

FIG. 15B is a flowchart for explaining the operation of a base station that transmits HARQ-ACK feedback for multi-slot PUSCH transmission (TBoMS) consisting of one TB and/or PUSCH transmission in which joint channel estimation is performed, according to an embodiment of the disclosure.

The base station may transmit TB processing over multi-slot (TBoMS), including information on a position of a start symbol, length of symbol, number of multiple slots, time domain resource allocation type, and bundling size for joint channel estimation, and/or joint channel estimation configuration/scheduling information through higher layer signaling or L1 signaling (1511). The base station may configure a default value of HARQ-ACK feedback information for PUSCH to NACK (1512). The base station may receive and decode the PUSCH from the terminal and generate HARQ-ACK feedback information for the decoded PUSCH. The base station may determine that the transmission resource position condition of the PDCCH transmitting the DCI including the HARQ-ACK information satisfies one of the conditions related to the validity of the HARQ-ACK information described above in the disclosure or a combination of the conditions described above in the disclosure (1514). For example, whether a distance between the position of the first symbol of the PDCCH to be transmitted and the last symbol in which the PUSCH is received is greater than or equal to a certain period of time may be the above condition. If the condition in operation 1514 is satisfied, the base station may update the HARQ-ACK feedback information with the PUSCH decoding result and transmit the updated HARQ-ACK feedback information to the terminal (1515). Otherwise, the base station may transmit the HARQ-ACK feedback information without update (1516).

The base station according to an embodiment of the disclosure may transmit TB processing over multi-slot (TBoMS), including information on a position of a start symbol, length of symbol, number of multiple slots, time domain resource allocation type, and bundling size for joint channel estimation, and/or joint channel estimation configuration/scheduling information through higher layer signaling or L1 signaling. The base station may configure a default value of HARQ-ACK feedback information for PUSCH to NACK. The base station may receive and decode the PUSCH from the terminal and generate HARQ-ACK feedback information for the decoded PUSCH. If the HARQ-ACK feedback information is generated a certain time before the PDCCH is transmitted, the base station updates the HARQ-ACK feedback information with the generated HARQ-ACK feedback information and transmits the updated HARQ-ACK feedback information to the terminal. If the HARQ-ACK feedback information is not generated, the base station may transmit the HARQ-ACK feedback information to the terminal without update.

The base station according to an embodiment of the disclosure may transmit TB processing over multi-slot (TBoMS), including information on a position of a start symbol, length of symbol, number of multiple slots, time domain resource allocation type, and bundling size for joint channel estimation, and/or joint channel estimation configuration/scheduling information through higher layer signaling or L1 signaling. The base station may configure a default value of HARQ-ACK feedback information for PUSCH to NACK. The base station may receive and decode the PUSCH from the terminal and generate HARQ-ACK feedback information for the decoded PUSCH. The base station may schedule the resources of the PDCCH for transmitting the DCI including the HARQ-ACK feedback information to satisfy one of the conditions related to the validity of the HARQ-ACK information described above in the disclosure or a combination of the conditions described above in the disclosure. For example, the base station may select a PDCCH transmission resource where the position of the first symbol of the PDCCH transmission resource is a certain period or more from the last symbol of the PUSCH reception, and transmit the DCI including the HARQ-ACK feedback information.

FIG. 16 is a block diagram of a terminal according to an embodiment of the disclosure. With reference to FIG. 16, a terminal 1600 may include a transceiver 1601, a controller (processor) 1602, and a storage (memory) 1603. According to an efficient channel and signal transceiving method in a 5G communication system corresponding to the above-described embodiment, the transceiver 1601, controller 1602, and storage 1603 of the terminal 1600 may operate. However, components of the terminal 1600 according to an embodiment are not limited to the above-described example. According to another embodiment, the terminal 1600 may include more components than the above-described components or may include fewer components. In addition, in a specific case, the transceiver 1601, the controller 1602, and the storage 1603 may be implemented in the form of a single chip.

The transceiver 1601 may include a transmitter and a receiver according to another embodiment. The transceiver 1601 may exchange signals with a base station. The signals may include control information and data. To achieve this, the transceiver 1601 may include a radio frequency (RF) transmitter to up-convert and amplify a frequency of a transmitted signal, and an RF receiver to low-noise amplify a received signal and to down-convert a frequency. In addition, the transceiver 1601 may receive a signal through a wireless channel and may output the signal to the controller 1602, and may transmit a signal outputted from the controller 1602 through the wireless channel.

The controller 1602 may control a series of processes for operating the terminal 1600 according to the above-described embodiment of the disclosure. For example, the controller 1602 may perform a method for changing an OFDM symbol position of a DMRS by considering a method for jointly estimating a channel by using DRMSs transmitted through a plurality of PUSCHs. To achieve this, the controller 1602 may include at least one processor. For example, the controller 1602 may include a communication processor (CP) to perform control for communication, and an application processor (AP) to control a higher layer such as an application program.

The storage 1603 may store control information or data such as information related to channel estimation which uses DMRSs transmitted through a PUSCH included in a signal obtained by the terminal 1600, and may have an area for storing data necessary for control of the controller 1602 and data generated when the controller 1602 controls.

FIG. 17 is a block diagram of a base station according to an embodiment. With reference to FIG. 17, a base station 1700 may include a transceiver 1701, a controller (processor) 1702, and a storage (memory) 1703. According to an efficient channel and signal transceiving method in a 5G communication system corresponding to the above-described embodiment, the transceiver 1701, controller 1702, and storage 1703 of the base station 1700 may operate. However, components of the base station 1700 according to an embodiment are not limited to the above-described example. According to another embodiment, the base station 1700 may include more components than the above-described components or may include fewer components. In addition, in a specific case, the transceiver 1701, controller 1702, and storage 1703 may be implemented in the form of a single chip.

The transceiver 1701 may include a transmitter and a receiver according to another embodiment. The transceiver 1701 may exchange signals with a terminal. The signals may include control information and data. To achieve this, the transceiver 1701 may include an RF transmitter to up-convert and amplify a frequency of a transmitted signal, and an RF receiver to low-noise amplify a received signal and to down-convert a frequency. In addition, the transceiver 1701 may receive a signal through a wireless channel and may output the signal to the controller 1702, and may transmit a signal outputted from the controller 1702 through the wireless channel.

The controller 1702 may control a series of processes for operating the base station 1700 according to the above-described embodiment of the disclosure. For example, the controller 1702 may perform a method for changing an OFDM symbol position of a DRMS by considering a method for estimating a channel by using DRMSs transmitted through a PUSCH according to an embodiment of the disclosure. To achieve this, the controller 1702 may include at least one processor. For example, the controller 1702 may include a communication processor (CP) to perform control for communication, and an application processor (AP) to control a higher layer such as an application program.

The storage 1703 may store control information, data of information related to channel estimation or control information, data received from the terminal, by using DMRSs transmitted through the PUSCH determined by the base station 1700, and may have an area for storing data necessary for control of the controller 1702 and data generated when the controller 1702 controls.

Meanwhile, the embodiments of the disclosure disclosed in the specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the respective embodiments may be combined with each other as required to be operated.

The invention claimed is:

1. A method performed by a terminal in a wireless communication system, the method comprising:
   receiving, from a base station, PUSCH configuration information for joint channel estimation by using transport block (TB) processing over multi-slots (TBoMS) in which one TB is allocated and transmitted to multiple slots, or a DMRS received through a plurality of PUSCHs;
   transmitting, to the base station, at least one PUSCH according to the PUSCH configuration information;
   receiving, from the base station, feedback delay information and a PDCCH, which includes an HARQ process number corresponding to the at least one PUSCH; and determining, on a basis of the PUSCH configuration information and the feedback delay information, validity of HARQ-ACK information included in the PDCCH.

2. The method of claim 1, wherein in case where the terminal receives the PUSCH configuration information for TBoMS and transmits the at least one PUSCH according to the PUSCH configuration information, the validity of the HARQ-ACK information included in the PDCCH is determined to be valid when a difference between a last symbol of the PUSCH transmitted through a last slot among the PUSCHs transmitted according to the PUSCH configuration information and a first symbol of the PDCCH is greater than a value based on the feedback delay information.

3. The method of claim 1, wherein in case where the terminal receives the PUSCH configuration information for joint channel estimation and transmits the at least one PUSCH according to the PUSCH configuration information, the validity of the HARQ-ACK information included in the PDCCH is determined to be valid when a difference between a last symbol of the PUSCH transmitted through a last slot on a time domain window (TDW) configured for the joint channel estimation, among the PUSCHs transmitted according to the PUSCH configuration information, and a first symbol of the PDCCH is greater than a value based on the feedback delay information.

4. The method of claim 1,
   wherein in case where the HARQ-ACK information included in the PDCCH is determined to be valid and the HARQ-ACK information indicates ACK, transmission for the PUSCH having the same HARQ process number as the HARQ process number is terminated early, and
   wherein in case where the HARQ-ACK information included in the PDCCH is determined to be valid and the HARQ-ACK information indicates NACK, the terminal performs retransmission to the base station for the PUSCH having the same HARQ process number as the HARQ process number.

5. The method of claim 1, wherein the feedback delay information is determined based on the PUSCH configuration information.

6. A method performed by a base station in a wireless communication system, the method comprising:
   transmitting, to a terminal, PUSCH configuration information for joint channel estimation by using transport block (TB) processing over multi-slots (TBoMS) in which one TB is allocated and transmitted to multiple slots, or a DMRS received through a plurality of PUSCHs;
   receiving, from the terminal, at least one PUSCH according to the PUSCH configuration information;
   transmitting, to the terminal, feedback delay information and a PDCCH, which includes an HARQ process number corresponding to the at least one PUSCH; and
   determining, on a basis of the PUSCH configuration information and the feedback delay information, validity of HARQ-ACK information included in the PDCCH.

7. The method of claim 6, wherein in case where the base station transmits the PUSCH for TBoMS and receives, from the terminal, the at least one PUSCH according to the PUSCH configuration information, the validity of the HARQ-ACK information included in the PDCCH is determined to be valid when a difference between a last symbol of the PUSCH received through a last slot among the PUSCHs received according to the PUSCH configuration information and a first symbol of the PDCCH is greater than a value based on the feedback delay information.

8. The method of claim 6, wherein in case where the base station transmits the PUSCH configuration information for joint channel estimation and receives the at least one PUSCH according to the PUSCH configuration information, the validity of the HARQ-ACK information included in the PDCCH is determined to be valid when a difference between a last symbol of the PUSCH received through a last slot on a time domain window (TDW) configured for the joint channel estimation, among the PUSCHs received according to the PUSCH configuration information, and a first symbol of the PDCCH is greater than a value based on the feedback delay information.

9. The method of claim 6, wherein whether to update the HARQ-ACK feedback information is determined based on the PUSCH configuration information, the feedback delay information, and transmission time information of the PDCCH.

10. A terminal in a wireless communication system, the terminal comprising:

a transceiver that transmits and receives a signal; and a controller, wherein the controller is configured to:

receive, from a base station, PUSCH configuration information for joint channel estimation by using transport block (TB) processing over multi-slots (TBoMS) in which one TB is allocated and transmitted to multiple slots, or a DMRS received through a plurality of PUSCHs, transmit, to the base station, at least one PUSCH according to the PUSCH configuration information, receive, from the base station, feedback delay information and a PDCCH, which includes an HARQ process number corresponding to the at least one PUSCH, and determine, on a basis of the PUSCH configuration information and the feedback delay information, validity of HARQ-ACK information included in the PDCCH.

11. The terminal of claim 10, wherein in case where the terminal receives the PUSCH configuration information for TBoMS and transmits the at least one PUSCH according to the PUSCH configuration information, the validity of the HARQ-ACK information included in the PDCCH is determined to be valid when a difference between a last symbol of the PUSCH transmitted through a last slot among the PUSCHs transmitted according to the PUSCH configuration information and a first symbol of the PDCCH is greater than a value based on the feedback delay information.

12. The terminal of claim 10, wherein in case where the terminal receives the PUSCH configuration information for joint channel estimation and transmits the at least one PUSCH according to the PUSCH configuration information, the validity of the HARQ-ACK information included in the PDCCH is determined to be valid when a difference between a last symbol of the PUSCH transmitted through a last slot on a time domain window (TDW) configured for the joint channel estimation, among the PUSCHs transmitted according to the PUSCH configuration information, and a first symbol of the PDCCH is greater than a value based on the feedback delay information.

13. A base station in a wireless communication system, the base station comprising:

a transceiver that transmits and receives a signal; and a controller, wherein the controller is configured to:

transmit, to a terminal, PUSCH configuration information for joint channel estimation by using transport block (TB) processing over multi-slots (TBoMS) in which one TB is allocated and transmitted to multiple slots, or a DMRS received through a plurality of PUSCHs, receive, from the terminal, at least one PUSCH according to the PUSCH configuration information, transmit, to the terminal, feedback delay information and a PDCCH, which includes an HARQ process number corresponding to the at least one PUSCH, and determine, on a basis of the PUSCH configuration information and the feedback delay information, validity of HARQ-ACK information included in the PDCCH.

14. The base station of claim 13, wherein in case where the base station transmits the PUSCH for TBoMS and receives, from the terminal, the at least one PUSCH according to the PUSCH configuration information, the validity of the HARQ-ACK information included in the PDCCH is determined to be valid when a difference between a last symbol of the PUSCH received through a last slot among the PUSCHs received according to the PUSCH configuration information and a first symbol of the PDCCH is greater than a value based on the feedback delay information.

15. The base station of claim 13, wherein in case where the base station transmits the PUSCH configuration information for joint channel estimation and receives the at least one PUSCH according to the PUSCH configuration information, the validity of the HARQ-ACK information included in the PDCCH is determined to be valid when a difference between a last symbol of the PUSCH received through a last slot on a time domain window (TDW) configured for the joint channel estimation, among the PUSCHs received according to the PUSCH configuration information, and a first symbol of the PDCCH is greater than a value based on the feedback delay information.

\* \* \* \* \*